(12) United States Patent
Zhamu et al.

(10) Patent No.: US 10,283,280 B2
(45) Date of Patent: May 7, 2019

(54) PROCESS FOR FLEXIBLE AND SHAPE-CONFORMAL ROPE-SHAPE SUPERCAPACITORS

(71) Applicant: Nanotek Instruments, Inc., Dayton, OH (US)

(72) Inventors: Aruna Zhamu, Springboro, OH (US); Bor Z. Jang, Centerville, OH (US)

(73) Assignee: Nanotek Instruments, Inc., Dayton, OH (US)

( * ) Notice: Subject to any disclaimer, the term of this patent is extended or adjusted under 35 U.S.C. 154(b) by 617 days.

(21) Appl. No.: 15/398,421

(22) Filed: Jan. 4, 2017

(65) Prior Publication Data
US 2018/0233297 A1    Aug. 16, 2018

(51) Int. Cl.
| | |
|---|---|
| *H01G 9/00* | (2006.01) |
| *H01G 11/06* | (2013.01) |
| *H01G 11/50* | (2013.01) |
| *H01G 11/48* | (2013.01) |
| *H01G 11/46* | (2013.01) |
| *H01G 11/42* | (2013.01) |
| *H01G 11/36* | (2013.01) |
| *H01G 11/26* | (2013.01) |
| *H01G 11/24* | (2013.01) |

(Continued)

(52) U.S. Cl.
CPC ........... *H01G 11/06* (2013.01); *H01G 9/0029* (2013.01); *H01G 9/04* (2013.01); *H01G 11/24* (2013.01); *H01G 11/26* (2013.01); *H01G 11/36* (2013.01); *H01G 11/42* (2013.01); *H01G 11/46* (2013.01); *H01G 11/48* (2013.01); *H01G 11/50* (2013.01); *H01G 11/52* (2013.01); *H01G 11/58* (2013.01); *H01G 11/74* (2013.01); *H01G 11/84* (2013.01)

(58) Field of Classification Search
CPC ........ H01G 9/04; H01G 9/0029; H01G 11/06; H01G 11/24; H01G 11/26; H01G 11/36; H01G 11/46; H01G 11/42; H01G 11/48; H01G 11/50; H01G 11/52; H01G 11/58; H01G 11/74; H01G 11/84
See application file for complete search history.

(56) References Cited

U.S. PATENT DOCUMENTS

| | | |
|---|---|---|
| 4,522,897 A | 6/1985 | Walsh |
| 7,071,258 B1 | 7/2006 | Jang et al. |

(Continued)

OTHER PUBLICATIONS

PCT/US17/67076 International Search Report and Written Opinion dated Mar. 1, 2018, 9 pages.

(Continued)

*Primary Examiner* — Seahvosh Nikmanesh

(57) ABSTRACT

Provided is a process for producing a rope-shaped supercapacitor comprising: (a) impregnating a first mixture of a first electrode active material (e.g. activated carbon or isolated graphene sheets) and a first electrolyte into pores of a first porous rod to form a first electrode; (b) encasing a porous separator around the first electrode to form a separator-protected first electrode; (c) impregnating a second mixture of a second electrode active material and a second electrolyte into pores of a second conductive porous rod to form a second electrode; (d) combining the separator-protected first electrode and second electrode form a braid or twist yarn; and (e) wrapping or encasing a protective sheath around the braid or yarn to form the supercapacitor.

24 Claims, 20 Drawing Sheets

(51) Int. Cl.
*H01G 11/74* (2013.01)
*H01G 11/52* (2013.01)
*H01G 11/58* (2013.01)
*H01G 11/84* (2013.01)
*H01G 9/04* (2006.01)

(56) References Cited

U.S. PATENT DOCUMENTS

| | | | |
|---|---|---|---|
| 7,623,340 | B1 | 11/2009 | Song et al. |
| 7,759,008 | B2 | 7/2010 | Barker et al. |
| 9,905,856 | B1 * | 2/2018 | Zhamu .................... H01M 4/78 |
| 10,008,747 | B1 * | 6/2018 | Zhamu .............. H01M 10/0587 |
| 10,083,799 | B2 * | 9/2018 | Zhamu ................... H01G 11/28 |
| 2005/0271574 | A1 | 12/2005 | Jang et al. |
| 2009/0059474 | A1 | 3/2009 | Zhamu et al. |
| 2009/0061312 | A1 | 3/2009 | Zhamu et al. |
| 2010/0021819 | A1 | 1/2010 | Zhamu et al. |
| 2010/0222482 | A1 | 9/2010 | Jang et al. |
| 2012/0009331 | A1 | 1/2012 | Kwon et al. |
| 2012/0015233 | A1 | 1/2012 | Kwon et al. |
| 2012/0015239 | A1 | 1/2012 | Kwon et al. |
| 2014/0098461 | A1 | 4/2014 | Zhamu et al. |

OTHER PUBLICATIONS

Chen, Z. et al. "Three-dimensional flexible and conductive interconnected graphene networks grown by chemical vapor deposition," Nature Materials, 10, 424-428 (2011).

* cited by examiner scale = 500 nm

Metal grid;  scale = 200 μm

Carbon nano-fiber mat; fiber diameter = 150 nm

Graphene foam; ___ 100 μm

Carbon foam

Graphite foam

Ni foam

Cu foam

Stainless steel foam

PROCESS FOR FLEXIBLE AND SHAPE-CONFORMAL ROPE-SHAPE SUPERCAPACITORS

FIELD OF THE INVENTION

The present invention relates generally to the field of supercapacitors or ultracapacitors, and more particularly to the rope-shape supercapacitors that are flexible and shape-conformal.

BACKGROUND OF THE INVENTION

Conventional supercapacitors and batteries (e.g. 18650-type cylindrical cells, rectangular pouch cells, and prismatic cells) are mechanically rigid and this non-flexibility feature has severely constrained their adaptability or feasibility of being implemented in confined spaces or for use in wearable devices. Flexible and shape-conformable power sources can be used to overcome these design limitations. These new power sources will enable the development of next-generation electronic devices, such as smart mobile gadgets, roll-up displays, wearable devices, and biomedical sensors. Flexible and conformable power sources will also save weight and space in electric vehicles.

Electrochemical capacitors (ECs), also known as ultracapacitors or supercapacitors, are being considered for uses in hybrid electric vehicles (EVs) where they can supplement a battery used in an electric car to provide bursts of power needed for rapid acceleration, the biggest technical hurdle to making battery-powered cars commercially viable. A battery would still be used for cruising, but supercapacitors (with their ability to release energy much more quickly than batteries) would kick in whenever the car needs to accelerate for merging, passing, emergency maneuvers, and hill climbing. The EC must also store sufficient energy to provide an acceptable driving range. To be cost-, volume-, and weight-effective compared to additional battery capacity they must combine adequate energy densities (volumetric and gravimetric) and power densities with long cycle life, and meet cost targets as well.

ECs are also gaining acceptance in the electronics industry as system designers become familiar with their attributes and benefits. ECs were originally developed to provide large bursts of driving energy for orbital lasers. In complementary metal oxide semiconductor (CMOS) memory backup applications, for instance, a one-Farad EC having a volume of only one-half cubic inch can replace nickel-cadmium or lithium batteries and provide backup power for months. For a given applied voltage, the stored energy in an EC associated with a given charge is half that storable in a corresponding battery system for passage of the same charge. Nevertheless, ECs are extremely attractive power sources. Compared with batteries, they require no maintenance, offer much higher cycle-life, require a very simple charging circuit, experience no "memory effect," and are generally much safer. Physical rather than chemical energy storage is the key reason for their safe operation and extraordinarily high cycle-life. Perhaps most importantly, capacitors offer higher power density than batteries.

The high volumetric capacitance density of an EC relative to conventional capacitors (10 to 100 times greater than conventional capacitors) derives from using porous electrodes to create a large effective "plate area" and from storing energy in the diffuse double layer. This double layer, created naturally at a solid-electrolyte interface when voltage is imposed, has a thickness of only about 1 nm, thus forming an extremely small effective "plate separation." Such a supercapacitor is commonly referred to as an electric double layer capacitor (EDLC). The double layer capacitor is based on a high surface area electrode material, such as activated carbon, immersed in a liquid electrolyte. A polarized double layer is formed at electrode-electrolyte interfaces providing high capacitance. This implies that the specific capacitance of a supercapacitor is directly proportional to the specific surface area of the electrode material. This surface area must be accessible by electrolyte and the resulting interfacial zones must be sufficiently large to accommodate the so-called electric double-layer charges.

In some ECs, stored energy is further augmented by pseudo-capacitance effects, occurring again at the solid-electrolyte interface due to electrochemical phenomena such as the redox charge transfer.

However, there are Several Serious Technical Issues Associated with Current State-of-the-Art ECs or Supercapacitors:

(1) Experience with ECs based on activated carbon electrodes shows that the experimentally measured capacitance is always much lower than the geometrical capacitance calculated from the measured surface area and the width of the dipole layer. For very high surface area carbons, typically only about 10-20 percent of the "theoretical" capacitance was observed. This disappointing performance is related to the presence of micro-pores (<2 nm, mostly <1 nm) and ascribed to inaccessibility of some pores by the electrolyte, wetting deficiencies, and/or the inability of a double layer to form successfully in pores in which the oppositely charged surfaces are less than about 1-2 nm apart. In activated carbons, depending on the source of the carbon and the heat treatment temperature, a surprising amount of surfaces can be in the form of such micro-pores.

(2) Despite the high gravimetric capacitances at the electrode level (based on active material weights alone) as frequently claimed in open literature and patent documents, these electrodes unfortunately fail to provide energy storage devices with high capacities at the supercapacitor cell or pack level (based on the total cell weight or pack weight). This is due to the notion that, in these reports, the actual mass loadings of the electrodes and the apparent densities for the active materials are too low. In most cases, the active material mass loadings of the electrodes (areal density) is significantly lower than 10 mg/cm$^2$ (areal density =the amount of active materials per electrode cross-sectional area along the electrode thickness direction) and the apparent volume density or tap density of the active material is typically less than 0.75 g/cm$^{-3}$ (more typically less than 0.5 g/cm$^{-3}$ and most typically less than 0.3 g/cm$^{-3}$) even for relatively large particles of activated carbon.

The low mass loading is primarily due to the inability to obtain thicker electrodes (thicker than 100-200 μm) using the conventional slurry coating procedure. This is not a trivial task as one might think, and in reality the electrode thickness is not a design parameter that can be arbitrarily and freely varied for the purpose of optimizing the cell performance. Contrarily, thicker samples tend to become extremely brittle or of poor structural integrity and would also require the use of large amounts of binder resin. These problems are particularly acute for graphene material-based electrodes. It has not been previously possible to produce graphene-based electrodes that are thicker than 150 μm and remain highly porous with pores remaining fully accessible to liquid electrolyte. The low areal densities and low volume densities (related to thin electrodes and poor packing density) result in relatively low volumetric capacitances and low volumetric energy density of the supercapacitor cells.

With the growing demand for more compact and portable energy storage systems, there is keen interest to increase the utilization of the volume of the energy storage devices. Novel electrode materials and designs that enable high volumetric capacitances and high mass loadings are essential to achieving improved cell volumetric capacitances and energy densities.

(3) During the past decade, much work has been conducted to develop electrode materials with increased volumetric capacitances utilizing porous carbon-based materials, such as graphene, carbon nanotube-based composites, porous graphite oxide, and porous meso carbon. Although these experimental supercapacitors featuring such electrode materials can be charged and discharged at high rates and also exhibit large volumetric electrode capacitances (100 to 200 F/cm$^3$ in most cases, based on the electrode volume), their typical active mass loading of <1 mg/cm$^2$, tap density of <0.2 g/cm$^{-3}$, and electrode thicknesses of up to tens of micrometers (<<100 μm) are still significantly lower than those used in most commercially available electrochemical capacitors (i.e. 10 mg/cm$^2$, 100-200 μm), which results in energy storage devices with relatively low areal and volumetric capacitances and low volumetric energy densities.

(4) For graphene-based supercapacitors, there are additional problems that remain to be solved, explained below:

Nano graphene materials have recently been found to exhibit exceptionally high thermal conductivity, high electrical conductivity, and high strength. Another outstanding characteristic of graphene is its exceptionally high specific surface area. A single graphene sheet provides a specific external surface area of approximately 2,675 m$^2$/g (that is accessible by liquid electrolyte), as opposed to the exterior surface area of approximately 1,300 m$^2$/g provided by a corresponding single-wall CNT (interior surface not accessible by electrolyte). The electrical conductivity of graphene is slightly higher than that of CNTs.

The instant applicants (A. Zhamu and B. Z. Jang) and their colleagues were the first to investigate graphene- and other nano graphite-based nano materials for supercapacitor application [Please see Refs.1-5 below; the 1$^{st}$ patent application was submitted in 2006 and issued in 2009]. After 2008, researchers began to realize the significance of nano graphene materials for supercapacitor applications.

LIST OF REFERENCES

1. Lulu Song, A. Zhamu, Jiusheng Guo, and B. Z. Jang "Nano-scaled Graphene Plate Nanocomposites for Supercapacitor Electrodes" U.S. Pat. No. 7,623,340 (Nov. 24, 2009).
2. Aruna Zhamu and Bor Z. Jang, "Process for Producing Nano-scaled Graphene Platelet Nanocomposite Electrodes for Supercapacitors," U.S. patent application Ser. No. 11/906,786 (Oct. 4, 2007).
3. Aruna Zhamu and Bor Z. Jang, "Graphite-Carbon Composite Electrodes for Supercapacitors" U.S. patent application Ser. No. 11/895,657 (Aug. 27, 2007).
4. Aruna Zhamu and Bor Z. Jang, "Method of Producing Graphite-Carbon Composite Electrodes for Supercapacitors" U.S. patent application Ser. No. 11/895,588 (Aug. 27, 2007).
5. Aruna Zhamu and Bor Z. Jang, "Graphene Nanocomposites for Electrochemical cell Electrodes," U.S. patent application Ser. No. 12/220,651 (Jul. 28, 2008).

However, individual nano graphene sheets have a great tendency to re-stack themselves, effectively reducing the specific surface areas that are accessible by the electrolyte in a supercapacitor electrode. The significance of this graphene sheet overlap issue may be illustrated as follows: For a nano graphene platelet with dimensions of l (length)×w (width)×t (thickness) and density ρ, the estimated surface area per unit mass is $S/m=(2/\rho)(1/l+1/w+1/t)$. With $\rho \approx 2.2$ g/cm$^3$, l=100 nm, w=100 nm, and t=0.34 nm (single layer), we have an impressive S/m value of 2,675 m$^2$/g, which is much greater than that of most commercially available carbon black or activated carbon materials used in the state-of-the-art supercapacitor. If two single-layer graphene sheets stack to form a double-layer graphene, the specific surface area is reduced to 1,345 m$^2$/g. For a three-layer graphene, t=1 nm, we have S/m=906 m$^2$/g. If more layers are stacked together, the specific surface area would be further significantly reduced.

These calculations suggest that it is critically important to find a way to prevent individual graphene sheets to re-stack and, even if they partially re-stack, the resulting multi-layer structure would still have inter-layer pores of adequate sizes. These pores must be sufficiently large to allow for accessibility by the electrolyte and to enable the formation of electric double-layer charges, which typically require a pore size of at least 1 nm, more preferably at least 2 nm. However, these pores or inter-graphene spacings must also be sufficiently small to ensure a large tap density. Unfortunately, the typical tap density of graphene-based electrode is less than 0.3 g/cm$^3$, and most typically <<0.1 g/cm$^3$. To a great extent, the requirement to have large pore sizes and high porosity level and the requirement to have a high tap density are considered mutually exclusive in supercapacitors.

Another major technical barrier to using graphene sheets as a supercapacitor electrode active material is the challenge of depositing a thick active material layer onto the surface of a solid current collector (e.g. Al foil) using the conventional graphene-solvent slurry coating procedure. In such an electrode, the graphene electrode typically requires a large amount of a binder resin (hence, significantly reduced active material proportion vs. non-active or overhead materials/components). In addition, any electrode prepared in this manner that is thicker than 50 μm is brittle and weak. There has been no effective solution to these problems.

Therefore, there is clear and urgent need for supercapacitors that have high active material mass loading (high areal density), active materials with high apparent density (high tap density), high electrode thickness without significantly decreasing the electron and ion transport rates (e.g. without a long electron transport distance), high volumetric capacitance, and high volumetric energy density. For graphene-based electrodes, one must also overcome problems such as re-stacking of graphene sheets, the demand for large proportion of a binder resin, and difficulty in producing thick graphene electrode layers.

Additionally, thick electrodes in conventional supercapacitors are also mechanically rigid, not flexible, not bendable, and not conformal to a desired shape. As such, for conventional supercapacitors, high volumetric/gravimetric energy density and mechanical flexibility appear to be mutually exclusive.

With the growing demand for more compact and portable energy storage systems, there is keen interest to increase the utilization of the volume of the supercapacitors. Novel electrode materials and designs that enable high volumetric capacities and high mass loadings are essential to achieving improved cell volumetric capacities and energy densities for supercapacitors.

Therefore, there is clear and urgent need for supercapacitors that have high active material mass loading (high areal density), active materials with a high apparent density (high tap density), high electrode thickness without significantly decreasing the electron and ion transport rates (e.g. without a high electron transport resistance or long ion diffusion path), high gravimetric energy density, and high volumetric energy density. These attributes must be achieved, along with improved flexibility and shape conformability of the resulting supercapacitor.

SUMMARY OF THE INVENTION

The present invention provides a process for producing a rope-shape supercapacitor containing filamentary or rod-like anode and cathode electrodes that are combined to form a braid or twist yarn shape (e.g. twist 2-ply, 3-ply, 4-ply, 5-ply yarn or braid, etc.). The supercapacitor can be an electric double layer capacitor (EDLC, symmetric or asymmetric), pseudo-capacitor, lithium-ion capacitor, or sodium-ion capacitor. A lithium-ion capacitor or sodium-ion capacitor contains a pre-lithiated or pre-sodiated anode active material (i.e. a battery-type anode) and a cathode that contains a high surface area carbon material, such as activated carbon or graphene sheets (i.e. an EDLC type cathode).

The supercapacitor comprises: (a) a first electrode comprising a first electrically conductive porous rod (or filament) having pores and a first mixture of a first electrode active material and a first electrolyte, wherein the first mixture resides in pores of the first porous rod (e.g. foam of a filamentary shape); (b) a porous separator wrapping around or encasing the first electrode to form a separator-protected first electrode; (c) a second electrode comprising a second electrically conductive porous rod (e.g. foam of a filamentary shape) having pores and a second mixture of a second electrode active material and a second electrolyte, wherein the second mixture resides in the pores of the second porous rod; wherein the separator-protected first electrode and the second electrode are combined in a spiral manner to form a braid or twist yarn; and (d) a protective casing or sheath wrapping around or encasing the braid or twist yarn. The second electrolyte may be the same as or different than the first electrolyte. The pores in the first or second electrode preferably contain interconnected pores and the porous rod/filament is preferably open-cell foam.

In certain embodiments, the process for producing a rope-shaped supercapacitor comprises: (a) Impregnating a first mixture of a first electrode active material and a first electrolyte into pores of a first electrically conductive porous rod to form a first electrode; (b) wrapping or encasing a porous separator around the first electrode to form a separator-protected first electrode; (c) impregnating a second mixture of a second electrode active material and a second electrolyte into pores of a second electrically conductive porous rod to form a second electrode; (d) combining or interlacing the separator-protected first electrode and the second electrode together to form a braid or a twist yarn; and (e) wrapping or encasing a protective casing or sheath around the braid or twist yarn to form the rope-shaped supercapacitor.

The first active material and/or the second active material contains multiple particles of a carbon material and/or multiple isolated graphene sheets, wherein multiple graphene sheets contain single-layer graphene or few-layer graphene each having from 1 to 10 graphene planes and said multiple particles of carbon material or graphene sheets have a specific surface area no less than 500 $m^2/g$ when measured in a dried state (preferably >1,000 $m^2/g$ and more preferably >2,000 $m^2/g$). These isolated graphene sheets are not part of a graphene foam (if the porous rod is a graphene-based foam structure). These isolated graphene sheets are the true electrode active material, separate from or in addition to the porous rod.

In some preferred embodiments, the first or the second electrode active material contains particles of activated carbon or isolated graphene sheets having a length or width smaller than 1 μm to readily impregnate into the pores of the first or the second electrode, wherein the graphene sheets are selected from pristine graphene, graphene oxide, reduced graphene oxide, fluorinated graphene, nitrogenated or nitrogen-doped graphene, hydrogeneated or hydrogen-doped graphene, boron-doped graphene, chemically functionalized graphene, or a combination thereof In some embodiments, the first or second electrode may further contain a redox pair partner material selected from a metal oxide, a conducting polymer, an organic material, a non-graphene carbon material, an inorganic material, or a combination thereof. The partner material, in combination with graphene or activated carbon, forms a redox pair for providing pseudo-capacitance.

In certain embodiments, the first or second electrode contains the following materials as the only electrode active material in the first or second electrode: (a) graphene sheets alone; (b) graphene sheets mixed with a porous carbon material (e.g. activated carbon); (c) graphene sheets mixed with a partner material that forms a redox pair with the graphene sheets to develop pseudo-capacitance; or (d) graphene sheets and a porous carbon material mixed with a partner material that forms a redox pair with the graphene sheets or the porous carbon material to develop pseudo-capacitance, and wherein there is no other electrode active material present in the first or second electrode.

The invented supercapacitor may further comprise a porous separator wrapping around or encasing the second electrode to form a separator-protected second electrode. As such, both the first and second electrodes (each having an active material-electrolyte mixture pre-impregnated into pores of the porous rod) are encased by a porous separator prior to being braided or interlaced together to form a braid or twist yarn. Preferably, the two electrodes are as closely packed as possible to maximize the contact or interfacial areas between the electrodes.

In certain embodiments, the rope-shape supercapacitor further comprises a third electrolyte disposed between the braid or yarn and the protective sheath. The third electrolyte may be the same as or different than the first electrolyte or the second electrolyte.

In this supercapacitor, the first electrode can be a negative electrode (or anode) and the second electrode a positive electrode (or cathode). Alternatively, the second electrode is a negative electrode or anode and the first electrode is a positive electrode or cathode.

The supercapacitor can comprise a plurality of the first electrodes and/or a plurality of the second electrodes. In other words, the supercapacitor can have multiple anode and/or multiple cathode filaments/rods combined together to form a braid or twist yarn structure. At least one of the electrodes is an anode and at least one of the electrodes is a cathode.

In certain embodiments, the rope-shaped supercapacitor has a length and a diameter or thickness with a length-todiameter or length-to-thickness aspect ratio being at least 5, preferably at least 10, and more preferably at least 20.

In some embodiments, the supercapacitor comprises: (a) a first electrode comprising a first electrically conductive rod (not a porous foam) and a first mixture of a first electrode active material and a first electrolyte, wherein the first mixture is deposited on or in the first rod; (b) a porous separator wrapping around or encasing the first electrode to form a separator-protected first electrode; (c) a second electrode comprising a second electrically conductive rod that is porous and has pores and a second mixture of a second electrode active material and a second electrolyte, wherein the second mixture resides in the pores of the second rod that is porous; wherein the separator-protected first electrode and the second electrode are interlaced or combined in a spiral or twist manner to form a braid or yarn; and (d) a protective casing or sheath wrapping around or encasing the yarn or braid.

Thus, the invention provides a process for producing a rope-shaped supercapacitor having a length-to-diameter or length-to-thickness aspect ratio greater than 10. The process comprises: (a) Providing a first electrode comprising a first mixture of a first electrode active material and a first electrolyte and a first electrically conductive rod, wherein the first mixture is deposited on or in the first rod; (b) wrapping or encasing a porous separator around the first electrode to form a separator-protected first electrode; (c) impregnating a second mixture of a second electrode active material and a second electrolyte into pores of a second electrically conductive porous rod to form a second electrode; (d) combining or interlacing the separator-protected first electrode and the second electrode in a twist or spiral manner to form a braid or yarn; and (e) wrapping or encasing a protective casing or sheath around the braid or yarn to form the supercapacitor.

The first active material and/or the second active material may contain multiple particles of a carbon material and/or multiple isolated graphene sheets, having a high specific surface area (no less than 500 m$^2$/g, preferably >1,000 m$^2$/g, and more preferably >2,000 m$^2$/g). Again, these isolated graphene sheets are not part of a graphene foam (if the porous rod is a graphene-based foam structure). These isolated graphene sheets are the true electrode active material, separate from or in addition to the porous rod. Again, the first or second electrode may further contain a redox pair partner material selected from a metal oxide, a conducting polymer, an organic material, a non-graphene carbon material, an inorganic material, or a combination thereof. The partner material, in combination with graphene or activated carbon, forms a redox pair for providing pseudo-capacitance.

Again, the invented supercapacitor may further comprise a porous separator wrapping around or encasing the second electrode to form a separator-protected second electrode. In certain embodiments, the supercapacitor further comprises a third electrolyte disposed between the braid or yarn and the protective sheath. The third electrolyte may be the same as or different than the first electrolyte or the second electrolyte.

In some embodiments of the invention, the first or second electrode (but not both) comprises a conductive rod (not a foam) and the first or second mixture is coated or deposited on the surface of this conductive rod. This rod can be as simple as a metal wire, a conductive polymer fiber or yarn, a carbon or graphite fiber or yarn, or multiple wires, fibers, or yarns.

In certain embodiments, the rope-shaped supercapacitor has a first end and a second end and the first electrode contains a first terminal connector comprising at least one metallic wire, conductive carbon/graphite fiber, or conductive polymer fiber that is embedded in, connected to, or integral with the first electrode. In certain preferred embodiments, the at least one metallic wire, conductive carbon/graphite fiber, or conductive polymer fiber runs approximately from the first end to the second end. This wire or fiber preferably is protruded out of the first end or second end to become a terminal tab for connecting to an electronic device or external circuit or load.

Alternatively or additionally, the rope-shaped supercapacitor has a first end and a second end and the second electrode contains a second terminal connector comprising at least one metallic wire, conductive carbon/graphite fiber, or conductive polymer fiber that is embedded in, connected to, or integral with the second electrode. In certain embodiments, at least one metallic wire, conductive carbon/graphite fiber, or conductive polymer fiber runs approximately from the first end to the second end. This wire or fiber preferably is protruded out of the first end or second end to become a terminal tab for connecting to an electronic device or external circuit or load.

The first or second electrically conductive porous rod may contain a porous foam selected from a metal foam, metal web, metal fiber mat, metal nanowire mat, metal wire braid, conductive polymer fiber mat, conductive polymer foam, conductive polymer fiber braid, conductive polymer-coated fiber foam, carbon foam, graphite foam, carbon aerogel, graphene aerogel, carbon xerogel, graphene foam, graphene oxide foam, reduced graphene oxide foam, carbon fiber foam, graphite fiber foam, exfoliated graphite foam, or a combination thereof. These foams can be made into highly deformable and conformable structures.

These foam structures can be readily made into a porosity level >50%, typically and desirably >70%, more typically and preferably >80%, still more typically and preferably >90%, and most preferably >95% (graphene aerogel can exceed a 99% porosity level). The skeleton structure (pore walls) in these foams forms a 3D network of electron-conducting pathways while the pores can accommodate a large proportion of an electrode active material (anode active material in the anode or cathode active material in the cathode) without using any conductive additive or a binder resin.

The foam rod/filament can have a cross-section that is circular, elliptic, rectangular, square, hexagon, hollow, or irregular in shape. There is no particular restriction on the cross-sectional shape of the foam structure. The supercapacitor has a rope shape that has a length and a diameter or thickness and an aspect ratio (length/thickness or length/diameter ratio) greater than 10, preferably greater than 15, more preferably greater than 20, further preferably greater than 30, even more preferably greater than 50 or 100. There is no restriction on the length or diameter (or thickness) of the rope battery. The thickness or diameter is typically and preferably from 100 nm to 10 cm, more preferably and typically from 1μm to 1 cm, and most typically from 10 μm to 1 mm. The length can run from 1μm to tens of meters or even hundreds of meters (if so desired).

In certain embodiments of the invention, the supercapacitor is a lithium-ion capacitor or sodium-ion capacitor having an anode active material selected from the group consisting of pre-lithiated or pre-sodiated versions of (a) particles of natural graphite, artificial graphite, meso-carbon microbeads (MCMB), and carbon; (b) silicon (Si), germanium (Ge), tin (Sn), lead (Pb), antimony (Sb), bismuth (Bi), zinc (Zn), aluminum (Al), nickel (Ni), cobalt (Co), manganese (Mn), titanium (Ti), iron (Fe), and cadmium (Cd); (c) alloys or intermetallic compounds of Si, Ge, Sn, Pb, Sb, Bi, Zn, Al, or Cd with other elements, wherein the alloys or compounds can be stoichiometric or non-stoichiometric; (d) oxides, carbides, nitrides, sulfides, phosphides, selenides, and tellurides of Si, Ge, Sn, Pb, Sb, Bi, Zn, Al, Fe, Ni, Co, Ti, Mn, or Cd, and their mixtures or composites; and combinations thereof.

The lithium-ion capacitor or sodium-ion capacitor may contain pre-lithiated or pre-sodiated graphene sheets as an anode active material, selected from pre-lithiated or pre-sodiated versions of pristine graphene, graphene oxide, reduced graphene oxide, graphene fluoride, graphene chloride, graphene bromide, graphene iodide, hydrogenated graphene, nitrogenated graphene, boron-doped graphene, nitrogen-doped graphene, chemically functionalized graphene, a physically or chemically activated or etched version thereof, or a combination thereof.

In some embodiments, the supercapacitor is a sodium-ion capacitor, having an anode active material selected from petroleum coke, carbon black, amorphous carbon, activated carbon, hard carbon, soft carbon, templated carbon, hollow carbon nanowires, hollow carbon sphere, sodium titanate, $NaTi_2(PO_4)_3$, $Na_2Ti_3O_7$, $Na_2C_8H_4O_4$, $Na_2TP$, $Na_xTiO_2$ (x=0.2 to 1.0), $Na_2C_8H_4O_4$, carboxylate based materials, $C_8H_4Na_2O_4$, $C_8H_6O_4$, $C_8H_5NaO_4$, $C_8Na_2F_4O_4$, $C_{10}H_2Na_4O_8$, $C_{14}H_4O_6$, $C_{14}H_4Na_4O_8$, or a combination thereof.

In some preferred embodiment, the second or first electrode active material contains a lithium intercalation compound or lithium absorbing compound selected from the group consisting of lithium cobalt oxide, doped lithium cobalt oxide, lithium nickel oxide, doped lithium nickel oxide, lithium manganese oxide, doped lithium manganese oxide, lithium vanadium oxide, doped lithium vanadium oxide, lithium mixed-metal oxides, lithium iron phosphate, lithium vanadium phosphate, lithium manganese phosphate, lithium mixed-metal phosphates, metal sulfides, lithium selenide, lithium polysulfide, and combinations thereof.

In certain embodiments, the second or first electrode active material contains a sodium intercalation compound or a potassium intercalation compound selected from $NaFePO_4$, $Na_{(1-x)}K_xPO_4$, $KFePO_4$, $Na_{0.7}FePO_4$, $Na_{1.5}VOPO_4F_{0.5}$, $Na_3V_2(PO_4)_3$, $Na_3V_2(PO_4)_2F_3$, $Na_2FePO_4F$, $NaFeF_3$, $NaVPO_4F$, $KVPO_4F$, $Na_3V_2(PO_4)_2F_3$, $Na_{1.5}VOPO_4F_{0.5}$, $Na_3V_2(PO_4)_3$, $NaV_6O_{15}$, $Na_xVO_2$, $Na_{0.33}V_2O_5$, $Na_xCoO_2$, $Na_{2/3}[Ni_{1/3}Mn_{2/3}]O_2$, $Na_x(Fe_{1/2}Mn_{1/2})O_2$, $Na_xMnO_2$, $\lambda-MnO_2$, $Na_xK_{(1-x)}MnO_2$, $Na_{0.44}MnO_2$, $Na_{0.44}MnO_2/C$, $Na_4Mn_9O_{18}$, $NaFe_2Mn(PO_4)_3$, $Na_2Ti_3O_7$, $Ni_{1/3}Mn_{1/3}Co_{1/3}O_2$, $Cu_{0.56}Ni_{0.44}HCF$, $NiHCF$, $Na_xMnO_2$, $NaCrO_2$, $KCrO_2$, $Na_3Ti_2(PO_4)_3$, $NiCo_2O_4$, $Ni_3S_2/FeS_2$, $Sb_2O_4$, $Na_4Fe(CN)_6/C$, $NaV_{1-x}Cr_xPO_4F$, $Se_zS_y$, y/z=0.01 to 100, Se, sodium polysulfide, sulfur, Alluaudites, or a combination thereof, wherein x is from 0.1 to 1.0.

The first electrolyte and/or the second electrolyte may contain a lithium salt or sodium salt dissolved in a liquid solvent and wherein the liquid solvent is water, an organic solvent, an ionic liquid, or a mixture of an organic solvent and an ionic liquid. The liquid solvent may be mixed with a polymer to form a polymer gel.

The first electrolyte and/or second electrolyte preferably contains a lithium salt or sodium salt dissolved in a liquid solvent having a salt concentration greater than 2.5 M (preferably >3.0 M, further preferably >3.5 M, even more preferably >5.0 M, still more preferably >7.0 M, and most preferably >10 M, up to 15 M).

In the alkali metal battery, the first or second electrically conductive porous rod has at least 90% by volume of pores, the first or second electrode has a diameter or thickness no less than 200 μm or has an active mass loading (anode or cathode active material) occupying at least 30% by weight or by volume of the entire battery cell, or the first and second electrode active materials combined occupies at least 50% by weight or by volume of the entire battery cell.

In some preferred embodiments, the first or second electrically conductive porous rod has at least 95% by volume of pores, the first or second electrode has a diameter or thickness no less than 300 μm or has an active mass loading occupying at least 35% by weight or by volume of the entire battery cell, or the first and second electrode active materials combined occupies at least 60% by weight or by volume of the entire battery cell.

In some preferred embodiments, the first or second electrode active material comprises an alkali metal intercalation compound or alkali metal-absorbing compound selected from an inorganic material, an organic or polymeric material, a metal oxide/phosphate/sulfide, or a combination thereof. This compound can be an anode active material (e.g. lithium titanate or lithiated graphite) in a lithium-ion capacitor, wherein the cathode is an EDLC type having a high specific surface area (e.g. activated carbon). The metal oxide/phosphate/sulfide contains a vanadium oxide selected from the group consisting of $VO_2$, $Li_xVO_2$, $V_2O_5$, $Li_xV_2O_5$, $V_3O_8$, $Li_xV_3O_8$, $Li_xV_3O_7$, $V_4O_9$, $Li_xV_4O_9$, $V_6O_{13}$, $Li_xV_6O_{13}$, their doped versions, their derivatives, and combinations thereof, wherein 0.1<x<5.

This compound can be an inorganic material selected from a transition metal dichalcogenide, a transition metal trichalcogenide, or a combination thereof. Preferably, the inorganic material is selected from $TiS_2$, $TaS_2$, $MoS_2$, $NbSe_3$, $MnO_2$, $CoO_2$, an iron oxide, a vanadium oxide, or a combination thereof In some specific embodiments, the inorganic material is selected from: (a) bismuth selenide or bismuth telluride, (b) transition metal dichalcogenide or trichalcogenide, (c) sulfide, selenide, or telluride of niobium, zirconium, molybdenum, hafnium, tantalum, tungsten, titanium, cobalt, manganese, iron, nickel, or a transition metal; (d) boron nitride, or (e) a combination thereof.

Redox pair partner materials may be selected from an alkali metal intercalation compound or alkali metal-absorbing compound selected from a metal carbide, metal nitride, metal boride, metal dichalcogenide, or a combination thereof. Further specifically, the cathode contains an alkali metal intercalation compound or alkali metal-absorbing compound selected from an oxide, dichalcogenide, trichalcogenide, sulfide, selenide, or telluride of niobium, zirconium, molybdenum, hafnium, tantalum, tungsten, titanium, vanadium, chromium, cobalt, manganese, iron, or nickel in a nanowire, nano-disc, nano-ribbon, or nano platelet form.

In some embodiments, the redox pair partner material contains nano discs, nano platelets, nano-coating, or nano sheets of an inorganic material selected from: (a) bismuth selenide or bismuth telluride, (b) transition metal dichalcogenide or trichalcogenide, (c) sulfide, selenide, or telluride of niobium, zirconium, molybdenum, hafnium, tantalum, tungsten, titanium, cobalt, manganese, iron, nickel, or a transition metal; (d) boron nitride, or (e) a combination thereof; wherein the discs, platelets, or sheets have a thickness less than 100 nm (preferably <10 nm and more preferably <3 nm) to ensure a high specific surface area.

DESCRIPTION OF THE PREFERRED EMBODIMENTS

This invention is directed at a flexible and shape-conformable rope-like supercapacitor exhibiting an exceptionally high volumetric energy density and high gravimetric energy density compared to conventional supercapacitors. This supercapacitor can be an EDLC supercapacitor (symmetric or asymmetric), a redox or pseudo-capacitor, a lithium-ion capacitor (not lithium-ion battery), or sodium-ion capacitor (not sodium-ion battery). The supercapacitor is based on an aqueous electrolyte, a non-aqueous or organic electrolyte, a gel electrolyte, an ionic liquid electrolyte, or a mixture of organic and ionic liquid.

Figure 1A:
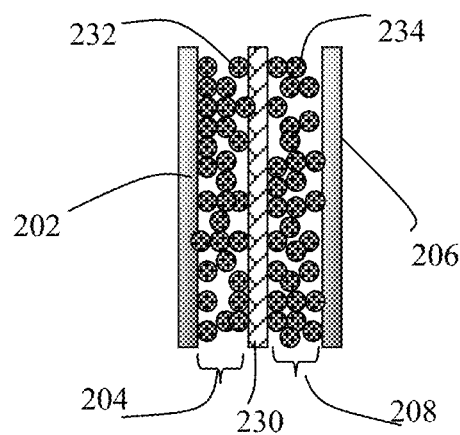
FIG. 1(A) Schematic of a prior art supercapacitor composed of an anode current collector (e.g. carbon-coated Al foil), an anode electrode (e.g. a layer of activated carbon particles and conductive additive bonded by a resin binder), a porous separator, a cathode electrode (e.g. a layer of activated carbon particles and conductive additive bonded by a resin binder), and a cathode current collector (e.g. Al foil)

As schematically illustrated in FIG. 1(A), a prior art supercapacitor cell is typically composed of an anode current collector 202 (e.g. Al foil 12-15 μm thick), an anode active material layer 204 (containing an anode active material, such as activated carbon particles 232 and conductive additives that are bonded by a resin binder, such as PVDF) coated on the current collector, a porous separator 230, a cathode active material layer 208 (containing a cathode active material, such as activated carbon particles 234, and conductive additives that are all bonded by a resin binder, not shown), a cathode current collector 206 (e.g. Al foil), and a liquid electrolyte disposed in both the anode active material layer 204 (also simply referred to as the "anode layer") and the cathode active material layer 208 (or simply "cathode layer"). The entire cell is encased in a protective housing, such as a thin plastic-aluminum foil laminate-based envelop. The prior art supercapacitor cell is typically made by a process that includes the following steps:

a) The first step is mixing particles of the anode active material (e.g. activated carbon), a conductive filler (e.g. graphite flakes), a resin binder (e.g. PVDF) in a solvent (e.g. NMP) to form an anode slurry. On a separate basis, particles of the cathode active material (e.g. activated carbon), a conductive filler (e.g. acetylene black), a resin binder (e.g. PVDF) are mixed and dispersed in a solvent (e.g. NMP) to form a cathode slurry.

b) The second step includes coating the anode slurry onto one or both primary surfaces of an anode current collector (e.g. Cu or Al foil), drying the coated layer by vaporizing the solvent (e.g. NMP) to form a dried anode electrode coated on Cu or Al foil. Similarly, the cathode slurry is coated and dried to form a dried cathode electrode coated on Al foil.

c) The third step includes laminating an anode/Al foil sheet, a porous separator layer, and a cathode/Al foil sheet together to form a 3-layer or 5-layer assembly, which is cut and slit into desired sizes and stacked to form a rectangular structure (as an example of shape) or rolled into a cylindrical cell structure.

d) The rectangular or cylindrical laminated structure is then encased in an aluminum-plastic laminated envelope or steel casing.

e) A liquid electrolyte is then injected into the laminated structure to make a supercapacitor cell.

There are several serious problems associated with this conventional process and the resulting supercapacitor cell:

1) It is very difficult to produce an activated carbon-based electrode layer (anode layer or cathode layer) that is thicker than 100 µm and practically impossible or impractical to produce an electrode layer thicker than 200 µm. There are several reasons why this is the case:
   a. An electrode of 100 µm thickness typically requires a heating zone of 30-50 meters long in a slurry coating facility, which is too time consuming, too energy intensive, and not cost-effective.
   b. Thicker electrodes have a great tendency to get delaminated and cracked.
   c. For some electrode active materials, such as graphene sheets, it has not been possible to produce an electrode thicker than 50 µm in a real manufacturing environment on a continuous basis. This is despite the notion that some thicker electrodes have been claimed in open or patent literature; these electrodes were prepared in a laboratory on a small scale. In a laboratory setting, presumably one could repeatedly add new materials to a layer and manually consolidate the layer to increase the thickness of an electrode. However, even with such a manual procedure (not amenable to mass production), the resulting electrode becomes very fragile and brittle.
   d. This problem is even worse for graphene-based electrodes, since repeated compressions lead to re-stacking of graphene sheets and, hence, significantly reduced specific surface area and reduced specific capacitance.

2) With a conventional process, as depicted in FIG. 1(A), the actual mass loadings of the electrodes and the apparent densities for the active materials are too low. In most cases, the active material mass loadings of the electrodes (areal density) is significantly lower than 10 mg/cm$^2$ and the apparent volume density or tap density of the active material is typically less than 0.75 g/cm$^3$ (more typically less than 0.5 g/cm$^3$ and most typically less than 0.3 g/cm$^3$) even for relatively large particles of activated carbon. In addition, there are other non-active materials (e.g. conductive additive and resin binder) that add additional weights and volumes to the electrode without contributing to the cell capacity. These low areal densities and low volume densities result in relatively low volumetric capacitances and low volumetric energy density.

3) The conventional process requires dispersing electrode active materials (anode active material and cathode active material) in a liquid solvent (e.g. NMP) to make a slurry and, upon coating on a current collector surface, the liquid solvent has to be removed to dry the electrode layer. Once the anode and cathode layers, along with a separator layer, are laminated together and packaged in a housing to make a supercapacitor cell, one then injects a liquid electrolyte into the cell. In actuality, one makes the two electrodes wet, then makes the electrodes dry, and finally makes them wet again. Such a wet-dry-wet process does not sound like a good process at all.

4) NMP is not an environmentally friendly solvent; it is known to potentially cause birth defects.

5) Current supercapacitors (e.g. symmetric supercapacitors or electric double layer capacitors, EDLC) still suffer from a relatively low gravimetric energy density and low volumetric energy density. Commercially available EDLCs exhibit a gravimetric energy density of approximately 6 Wh/kg and no experimental EDLC cells have been reported to exhibit an energy density higher than 10 Wh/kg (based on the total cell weight) at room temperature. Although experimental supercapacitors exhibit large volumetric electrode capacitances (100 to 200 F/cm$^3$ in most cases) at the electrode level (not the cell level), their typical active mass loading of <1 mg/cm$^2$, tap density of <0.1 g/cm$^{-3}$, and electrode thicknesses of up to tens of micrometers remain significantly lower than those used in most commercially available electrochemical capacitors, resulting in energy storage devices with relatively low areal and volumetric capacities and low volumetric energy densities based on the cell (device) weight.

In literature, the energy density data reported based on either the active material weight alone or electrode weight cannot directly translate into the energy densities of a practical supercapacitor cell or device. The "overhead weight" or weights of other device components (binder, conductive additive, current collectors, separator, electrolyte, and packaging) must also be taken into account. The convention production process results in an active material proportion being less than 30% by weight of the total cell weight (<15% in some cases; e.g. for graphene-based active material).

The present invention provides a process for producing a flexible and shape-conformable supercapacitor having a rope shape, high active material mass loading, low overhead weight and volume, high gravimetric energy density, and high volumetric energy density. In addition, the manufacturing costs of the supercapacitors produced by the presently invented process can be significantly lower than those by conventional processes and are much more environmentally benign.

Figure 1B:
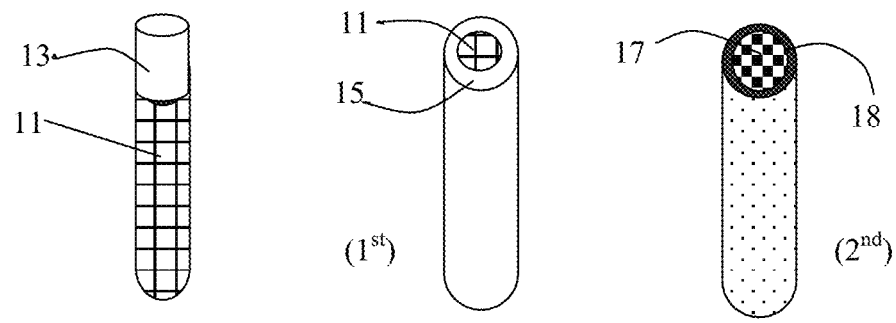
FIG. 1(B) Schematic of a process for producing a rope-shaped, flexible and shape-conformable supercapacitor.
Figure 1B:
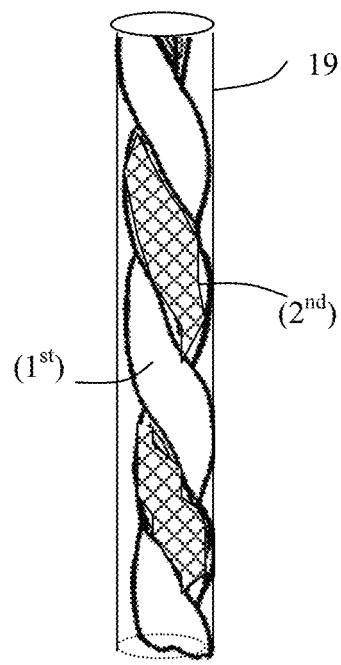
Figure 1C:
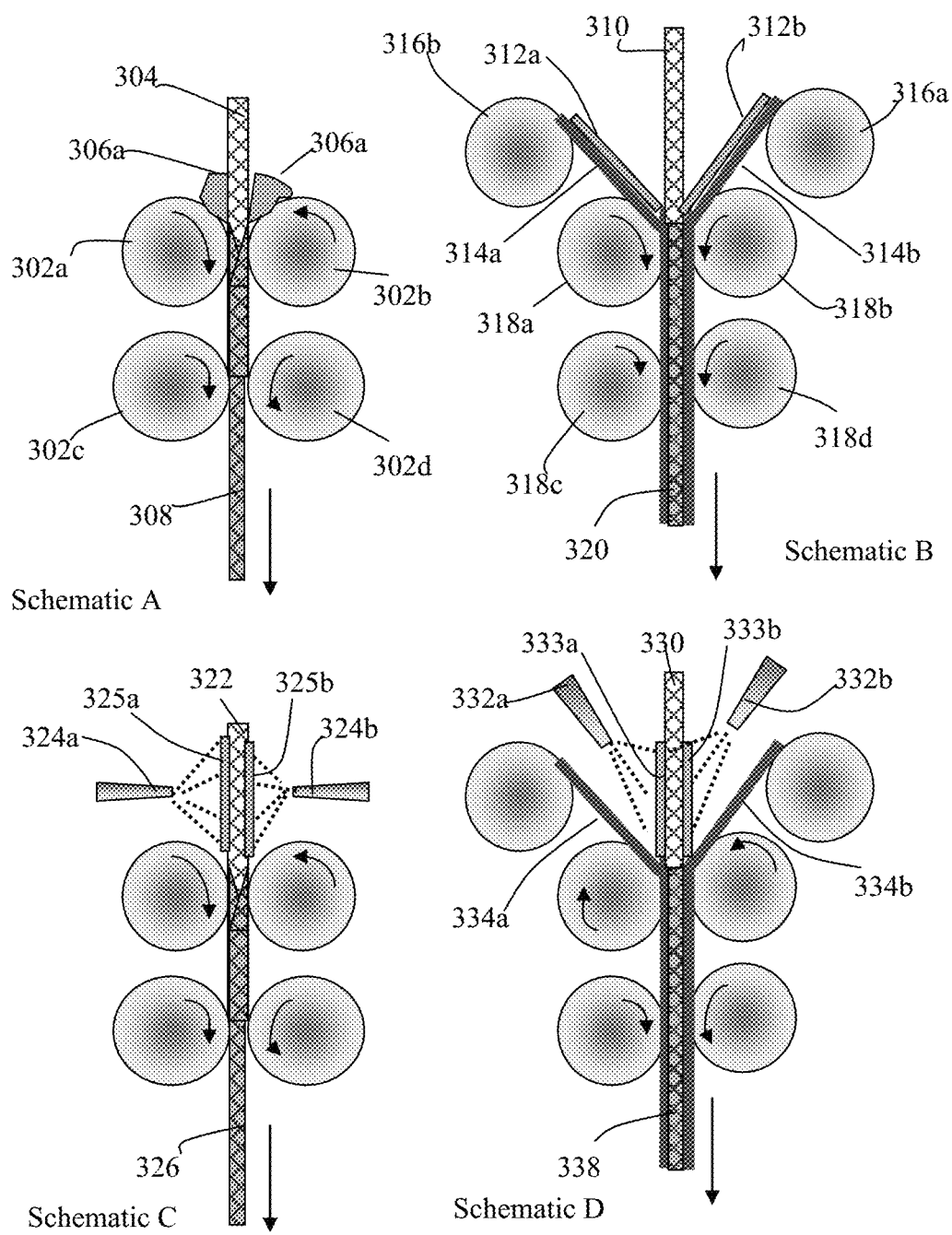
FIG. 1(C) Four examples of the procedure for producing an electrode (rod-shaped anode or cathode) in a continuous and automated manner.

In one embodiment of the present invention, as illustrated in FIG. 1(C), the present rope-shaped supercapacitor, containing braid- or yarn-shape electrodes, can be made by a process that includes a first step of supplying a first electrode 11, which is composed of an electrically conductive porous rod (e.g. carbon foam, graphene foam, metal nanowire mat, etc.) having pores that are partially or fully loaded with a mixture of a first electrode active material (e.g. activated carbon particles or isolated/separated graphene sheets, having a size smaller than the pore size of the porous rod) and a first electrolyte. A conductive additive or a resin binder may be optionally added into the mixture, but this is not required or even desired. This first electrode 11 can optionally contain an active material-free and electrolyte-free end section 13 that can serve as a terminal tab for connecting the supercapacitor to an external load. This first electrode can assume a cross-section that is of any shape; e.g. circular, rectangular, elliptic, square, hexagonal, hollow, or irregular in shape.

Alternatively, in the first step, the first electrode comprises a conductive rod (not a porous foam) and the first mixture is coated or deposited on the surface of this conductive rod. This rod can be as simple as a metal wire, conductive polymer fiber or yarn, carbon or graphite fiber or yarn, or multiple thin wires, fibers, or yarns. However, in this situation, the second electrode must contain a porous foam structure.

The second step involves wrapping around or encasing the first electrode 11 with a thin layer of porous separator 15 (e.g. porous plastic film, paper, fiber mat, non-woven, glass fiber cloth, etc.) that is permeable to ions in the electrolyte. This step can be as simple as wrapping the first electrode with a thin, porous plastic tape in one full circle or slightly more than one full circle, or in a spiral manner. The main purpose is to electronically separate the anode and the cathode to prevent internal shorting. The porous separator layer can be simply deposited all around the first electrode by spraying, printing, coating, dip casting, etc.

The third step involves preparing a second electrode 17 that comprises a mixture of second active material and second electrolyte and, optionally, a conductive additive or resin binder (although not necessary and not desirable). This second electrode 17 can optionally contain an active material-free and electrolyte-free end section that can serve as a terminal tab for connecting to an external load. The second electrode may be optionally but desirably encased or wrapped around by a porous separator layer 18.

This second electrode, with or without an encasing porous separator layer, is then combined with the first electrode using a braiding or yarn-making procedure to make a 2-ply twist yarn or braid. If the first electrode is an anode, then the second electrode is a cathode; or vice versa. A yarn or braid can contain multiple anodes (i.e. multiple filaments or rods each containing an anode active material and an electrolyte) combined with one single cathode or multiple cathodes. A yarn or braid can contain multiple cathodes (i.e. multiple filaments or rods each containing a cathode active material and an electrolyte) combined with one single anode or multiple anode filaments. As the final step, this braid or yarn structure is encased or protected by a protective casing or sheath 19 that is electrically insulating (e.g. a plastic sheath or rubber shell).

It may be noted that some additional electrolyte may be incorporated between the n-ply braid/yarn (n>2) and the protective sheath. However, this is not a requirement since all the electrode rods or filaments already contain an active material and an electrolyte in their pores.

In some embodiments, one of the electrodes comprises a porous rod having pores to accommodate an active material-electrolyte mixture and at least one of the electrodes is a non-porous rod (filament, fiber, wire, etc.) having an active material-electrolyte mixture coated on its surface.

Figure 1D:
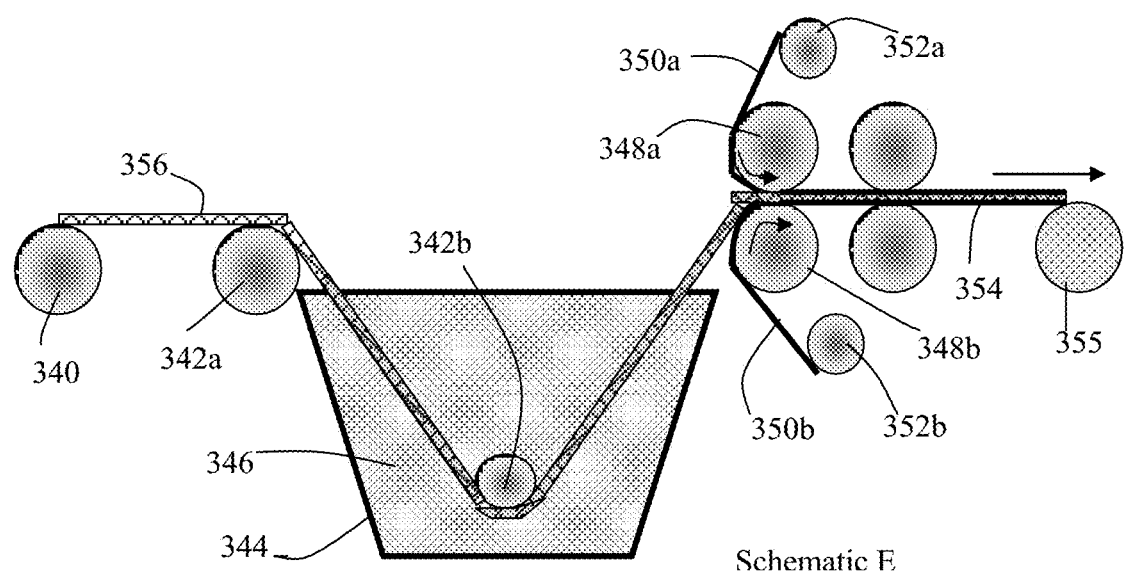
FIG. 1(D) Schematic of a presently invented process for continuously producing an alkali metal-ion battery electrode.

The electrodes of the instant supercapacitor may be produced in a roll-to-roll manner. In one embodiment, as illustrated in FIG. 1(C) and FIG. 1(D), the invented process comprises continuously feeding an electrically conductive porous rod/filament (e.g. 304, 310, 322, or 330), from a feeder roller (not shown), into an active material impregnation zone where a wet active material-electrolyte mixture (e.g. slurry, suspension, or gel-like mass, such as 306a, 306b, 312a, 312b) containing an electrode active material (e.g. activated carbon particles and/or graphene sheets) and an electrolyte, well mixed together, and an optional conductive additive is delivered to a porous surface of the porous layer (e.g. 304 or 310 in Schematic A and Schematic B, respectively, of FIG. 1(C)). Using Schematic A as an example, the wet active material-electrolyte mixture (306a, 306b) is forced to impregnate into the porous layer from both sides using one or two pairs of rollers (302a, 302b, 302c, and 302d) to form an impregnated active electrode 308 (an anode or cathode). The conductive porous layer contains interconnected electron-conducting pathways and preferably at least 70% by volume (preferably >80%, more preferably >90%) of pores. The foam rods/filaments typically have a pore volume from 50% to approximately 99%.

In Schematic B, two feeder rollers 316a, 316b are used to continuously pay out two protective films 314a, 314b that support wet active material-electrolyte mixture rods/filaments 312a, 312b. These wet active material-electrolyte mixture rods/filaments 312a, 312b can be delivered to the protective (supporting) films 314a, 314b using a broad array of procedures (e.g. printing, spraying, casting, coating, etc., which are well known in the art). As the conductive porous layer 110 moves though the gaps between two sets of rollers (318a, 318b, 318c, 318d), the wet active material-electrolyte mixture is impregnated into the pores of the porous rods or filaments 310 to form an active material electrode 320 (an anode or cathode electrode) tentatively covered by two protective films 314a, 314b.

Using Schematic C as another example, two spraying devices 324a, 324b are used to dispense the wet active material-electrolyte mixture (325a, 325b) to the two opposed porous surfaces of the conductive porous layer 322. The wet active material-electrolyte mixture is forced to impregnate into the porous rod from both sides using one or two pairs of rollers to form an impregnated active electrode 326 (an anode or cathode). Similarly, in Schematic D, two spraying devices 332a, 332b are used to dispense the wet active material-electrolyte mixture (333a, 333b) to the porous surfaces of the conductive porous rod 330. The wet active material-electrolyte mixture is forced to impregnate into the porous rod using one or two pairs of rollers to form an impregnated active electrode 338 (an anode or cathode).

Another example, as illustrated in Schematic E of FIG. 1(D), the electrode production process begins by continuously feeding a conductive porous rod 356 from a feeder roller 340. The porous rod 356 is directed by a roller 342 to get immersed into a wet active material-electrolyte mixture mass 346 (slurry, suspension, gel, etc.) in a container 344. The active material-electrolyte mixture begins to impregnate into pores of the porous rod 356 as it travels toward roller 342b and emerges from the container to feed into the gap between two rollers 348a, 348b. Two protective films 350a, 350b are concurrently fed from two respective rollers 352a, 352b to cover the impregnated porous rod 354, which may be continuously collected on a rotating drum (a winding roller 355). The process is applicable to both the anode and the cathode electrodes.

The resulting electrode rod or filament (anode or cathode electrode) can have a thickness or diameter from 100 nm to several centimeters (or thicker, if so desired). For a micro-cable (e.g. as a flexible power source for a micro-electronic device) the electrode thickness or diameter is from 100 nm to 100 µm, more typically from 1µm to 50 µm, and most typically from 10 µm to 30 µm. For a macroscopic, flexible and conformal cable battery (e.g. for use in confined spaces in an electric vehicle, EV), the electrode typically and desirably has a thickness no less than 100 µm (preferably >200 µm, further preferably >300 µm, more preferably >400 µm; further more preferably >500 µm, 600 µm, or even >1,000 µm; no theoretical limitation on the electrode thickness.

The above are but a few examples to illustrate how the presently invented flexible and shape-conformable rope-like alkali metal batteries can be made. These examples should not be used to limit the scope of the instant invention.

The electrically conductive porous rods or filaments may be selected from metal foam, metal web or screen, perforated metal sheet-based structure, metal fiber mat, metal nanowire mat, conductive polymer nano-fiber mat, conductive polymer foam, conductive polymer-coated fiber foam, carbon foam, graphite foam, carbon aerogel, carbon xerogel, graphene aerogel, graphene foam, graphene oxide foam, reduced graphene oxide foam, carbon fiber foam, graphite fiber foam, exfoliated graphite foam, or a combination thereof. The porous rods or filaments must be made of an electrically conductive material, such as a carbon, graphite, metal, metal-coated fiber, conductive polymer, or conductive polymer-coated fiber, which is in a form of highly porous mat, screen/grid, non-woven, foam, etc. Examples of conductive porous layers are presented in FIG. 3(A), FIG. 3(B), FIG. 3(C), and FIG. 3(D). The porosity level must be at least 50% by volume, preferably greater than 70%, further preferably greater than 90%, and most preferably greater than 95% by volume. The backbone of the foam or the foam walls forms an integral 3D network of electron-conducting pathways.

It may be noted that the graphene or graphene oxide material in a graphene foam, graphene oxide foam, or graphene aerogel foam structure constitutes the pore walls of the foam. This graphene or graphene oxide material in the form does not contain isolated or separated graphene sheets. This graphene or graphene oxide material in the foam is not part of the active material-electrolyte mixture that is impregnated into pores of the foam. This mixture can contain activated carbon particles or isolated graphene sheets that are not part of the foam structure. These activated carbon particles or isolated graphene sheets are the primary electrode active material of a supercapacitor.

These foam structures can be readily made into any cross-sectional shape. They also can be very flexible; typically, non-metallic foams being more flexible than metallic foams. However, metal nano-fibers can be made into highly flexible foams. Since the electrolyte is in either a liquid or gel state, the resulting cable battery can be very flexible and can be made to be conformal to essentially any odd shape. Even when the salt concentration in a liquid solvent is high (e.g. from 2.5 M to 15 M), the foam structure containing electrolyte inside their pores remains deformable, bendable, twistable, and conformable to even an odd shape.

In some embodiments, the electrically conductive porous rod in the first or second electrode contains a conductive polymer fiber mat, a carbon/graphite fiber mat, a fiber tow with pores between fibers, conductive fiber knit structure or nonwoven structure having multiple fibers and pores. These multiple fibers can contain conductive polymer fibers, metal-coated fibers, carbon-coated polymer fibers, carbon fibers, or graphite fibers.

Preferably, substantially all of the pores in the original conductive porous rods or filaments are filled with the electrode active material (anode or cathode), electrolyte, and optional conductive additive (no binder resin needed). Since there are great amounts of pores (more typically 70-99% or preferably and more typically 85%-99%) relative to the pore walls or conductive pathways (1-30%), very little space is wasted ("being wasted" means not being occupied by the electrode active material and electrolyte), resulting in high proportion of electrode active material-electrolyte mixture (high active material loading mass).

In such supercapacitor electrode configurations (e.g. FIG. 1(B)), the electrons only have to travel a short distance (half of the pore size, on average; e.g. nanometers or a few micrometers) before they are collected by the pore walls since pore walls are present everywhere throughout the entire electrode structure (the conductive foam serving as a current collector). These pore walls form a 3-D network of interconnected electron-transporting pathways with minimal resistance. Additionally, in each anode electrode or cathode electrode, all electrode active material particles are pre-dispersed in a liquid electrolyte (no wettability issue), eliminating the existence of dry pockets commonly present in an electrode prepared by the conventional process of wet coating, drying, packing, and electrolyte injection. Thus, the presently invented process delivers a totally unexpected advantage over the conventional supercapacitor cell production process.

In a preferred embodiment, the graphene electrode active material (in place of activated carbon) is selected from pristine graphene, graphene oxide, reduced graphene oxide, graphene fluoride, graphene chloride, graphene bromide, graphene iodide, hydrogenated graphene, nitrogenated graphene, chemically functionalized graphene, or a combination thereof. The starting graphitic material for producing any one of the above graphene materials may be selected from natural graphite, artificial graphite, meso-phase carbon, meso-phase pitch, meso-carbon micro-bead, soft carbon, hard carbon, coke, carbon fiber, carbon nano-fiber, carbon nano-tube, or a combination thereof.

The present invention also provides a lithium-ion capacitor (LIC) or a sodium-ion capacitor (NIC), wherein at least one of the two electrodes in a cell is produced by the presently invented process. More preferably, both the anode electrode and the cathode electrode for the presently invented LIC or NIC are made by the presently invented process described above. This inventive process includes (A) Continuously feeding an electrically conductive porous rod/filament to an anode material impregnation zone, wherein the conductive porous rod/filament has porous surfaces and contain interconnected electron-conducting pathways and, preferably, at least 70% by volume of pores; and (B) Impregnating a wet anode active material-electrolyte mixture into the electrically conductive porous rod from at least one porous surface to form an electrode. For instance, the wet anode active material mixture contains a liquid electrolyte and an anode active material preferably selected from pre-lithiated or pre-sodiated versions of graphite particles, carbon particles, Si nano particles, Sn nano particles, or any other commonly used anode active materials for lithium-ion batteries or sodium-ion batteries. These anode active materials can be made into a fine particle form and multiple particles, along with conductive additive particles, can be readily mixed with a liquid electrolyte to form a wet anode active material mixture (e.g. in a slurry form) for impregnation into a conductive porous layer. The corresponding cathode can contain an EDLC-type active material (e.g. activated carbon or isolated graphene sheets), with or without a redox pair partner material (such as an intrinsically conducting conjugate polymer or a transition metal oxide).

In a lithium-ion capacitor (LIC), the anode active material may be selected from the group consisting of: (a) Pre-lithiated particles of natural graphite, artificial graphite, meso-carbon microbeads (MCMB), and carbon; (b) Pre-lithiated particles or coating of Silicon (Si), germanium (Ge), tin (Sn), lead (Pb), antimony (Sb), bismuth (Bi), zinc (Zn), aluminum (Al), nickel (Ni), cobalt (Co), manganese (Mn), titanium (Ti), iron (Fe), and cadmium (Cd); (c) Pre-lithiated alloys or intermetallic compounds of Si, Ge, Sn, Pb, Sb, Bi, Zn, Al, or Cd with other elements, wherein said alloys or compounds are stoichiometric or non-stoichiometric; (d) Pre-lithiated oxides, carbides, nitrides, sulfides, phosphides, selenides, and tellurides of Si, Ge, Sn, Pb, Sb, Bi, Zn, Al, Fe, Ni, Co, Ti, Mn, or Cd, and their mixtures or composites; and (e) Pre-lithiated graphene sheets; and combinations thereof. Pre-lithiation can be accomplished electrochemically by using a compact mass of graphene sheets as the working electrode and lithium metal as the counter electrode. Pre-lithiation may also be accomplished by adding lithium powder or chips along with the anode active material (e.g. Si particles) and conductive additive particles into a liquid electrolyte.

In a sodium-ion capacitor, the anode active material contains a pre-sodiated version of petroleum coke, carbon black, amorphous carbon, activated carbon, hard carbon, soft carbon, templated carbon, hollow carbon nanowires, hollow carbon sphere, or titanate, or a sodium intercalation compound selected from $NaTi_2(PO_4)_3$, $Na_2Ti_3O_7$, $Na_2C_8H_4O_4$, $Na_2TP$, $Na_xTiO_2$ (x=0.2 to 1.0), $Na_2C_8H_4O_4$, carboxylate based material, $C_8H_4Na_2O_4$, $C_8H_6O_4$, $C_8H_5NaO_4$, $C_8Na_2F_4O_4, C_{10}H_2Na_4O_8$, $C_{14}H_4O_6$, $C_{14}H_4Na_4O_8$, or a combination thereof.

In a sodium-ion capacitor, the anode active material contains a sodium intercalation compound selected from the following groups of materials: (a) Sodium-doped silicon (Si), germanium (Ge), tin (Sn), lead (Pb), antimony (Sb), bismuth (Bi), zinc (Zn), aluminum (Al), titanium (Ti), cobalt (Co), nickel (Ni), manganese (Mn), cadmium (Cd), and mixtures thereof; (b) Sodium-containing alloys or intermetallic compounds of Si, Ge, Sn, Pb, Sb, Bi, Zn, Al, Ti, Co, Ni, Mn, Cd, and their mixtures; (c) Sodium-containing oxides, carbides, nitrides, sulfides, phosphides, selenides, tellurides, or antimonides of Si, Ge, Sn, Pb, Sb, Bi, Zn, Al, Fe, Ti, Co, Ni, Mn, Cd, and mixtures or composites thereof; (d) Sodium salts; and (e) Graphene sheets pre-loaded with sodium or potassium. Pre-sodiation can be accomplished electrochemically by using a compact mass of graphene sheets as the working electrode and sodium metal as the counter electrode. Pre-sodiation may also be accomplished by adding lithium powder or chips along with the anode active material (e.g. Sn particles) and conductive additive particles into a liquid electrolyte.

Bulk natural graphite is a 3-D graphitic material with each graphite particle being composed of multiple grains (a grain being a graphite single crystal or crystallite) with grain boundaries (amorphous or defect zones) demarcating neighboring graphite single crystals. Each grain is composed of multiple graphene planes that are oriented parallel to one another. A graphene plane in a graphite crystallite is composed of carbon atoms occupying a two-dimensional, hexagonal lattice. In a given grain or single crystal, the graphene planes are stacked and bonded via van der Waal forces in the crystallographic c-direction (perpendicular to the graphene plane or basal plane). Although all the graphene planes in one grain are parallel to one another, typically the graphene planes in one grain and the graphene planes in an adjacent grain are inclined at different orientations. In other words, the orientations of the various grains in a graphite particle typically differ from one grain to another.

Figure 2:
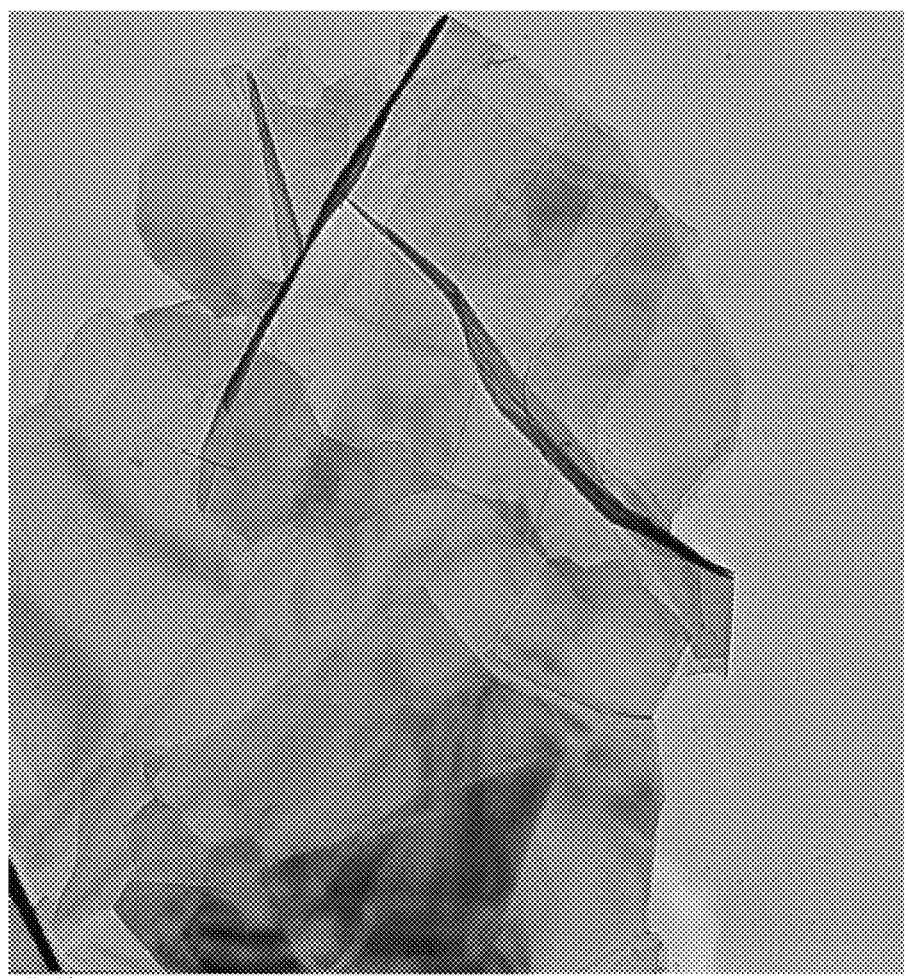
FIG. 2 An electron microscopic image of isolated graphene sheets.
Figure 3A:
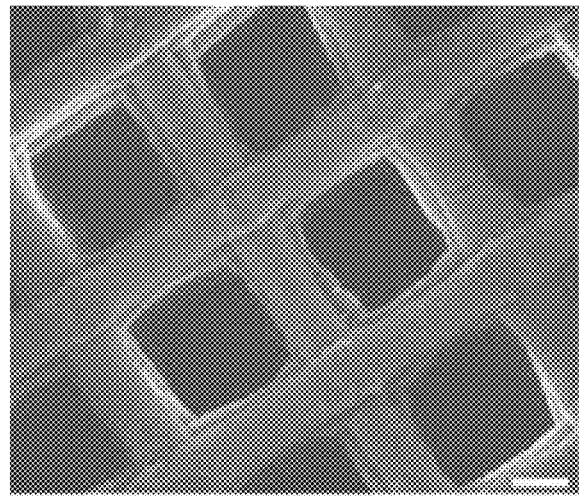
FIG. 3(A) Examples of conductive porous layers: metal grid/mesh and carbon nano-fiber mat.
Figure 3A:
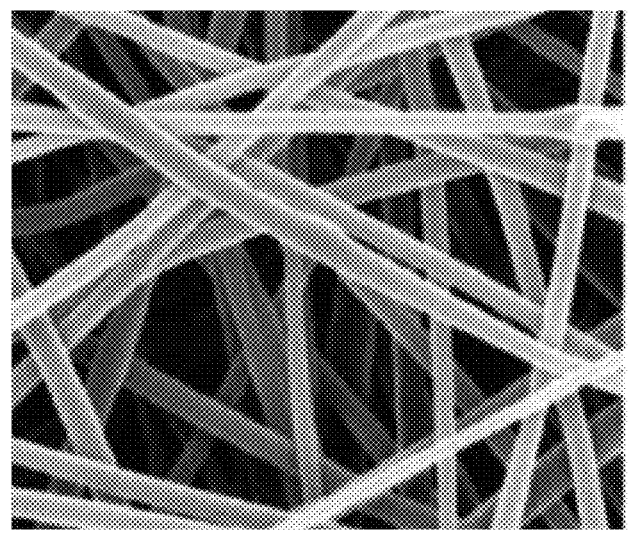
Figure 3B:
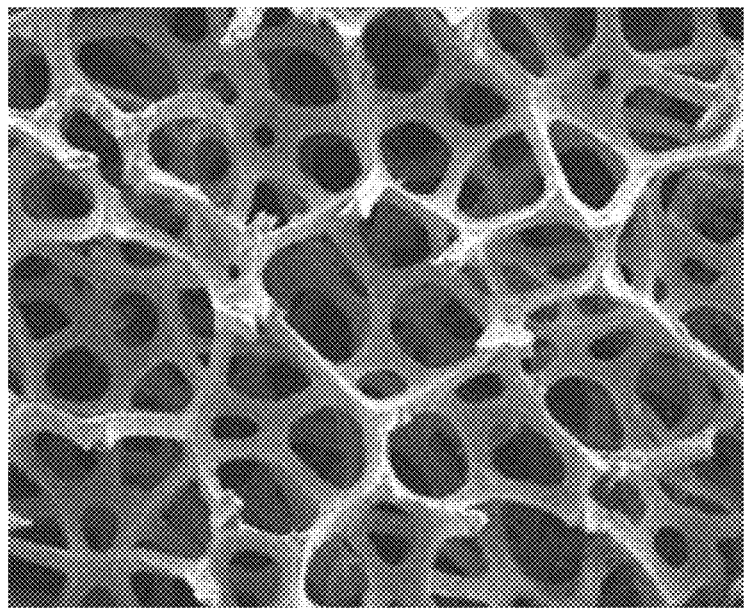
FIG. 3(B) Examples of conductive porous layers: graphene foam and carbon foam.
Figure 3B:
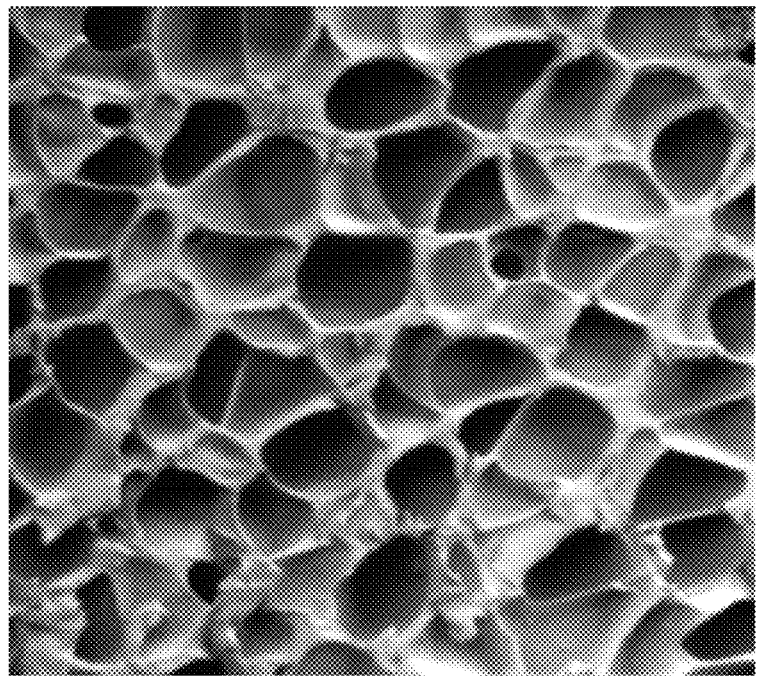
Figure 3C:
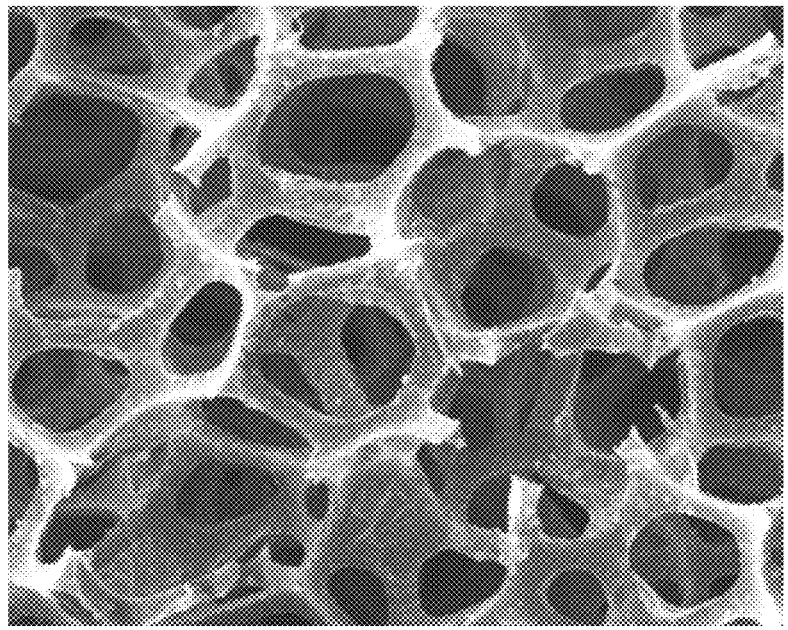
FIG. 3(C) Examples of conductive porous layers: graphite foam and Ni foam.
Figure 3C:
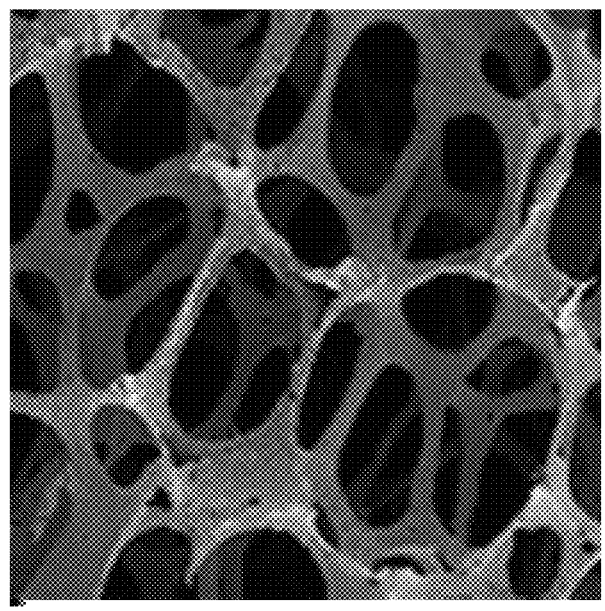
Figure 3D:
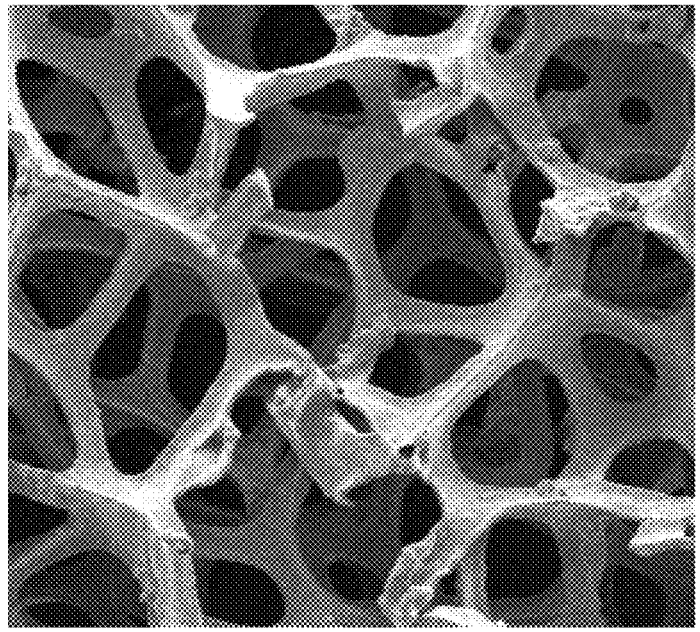
FIG. 3(D) Examples of conductive porous layers: Cu foam and stainless steel foam.
Figure 3D:
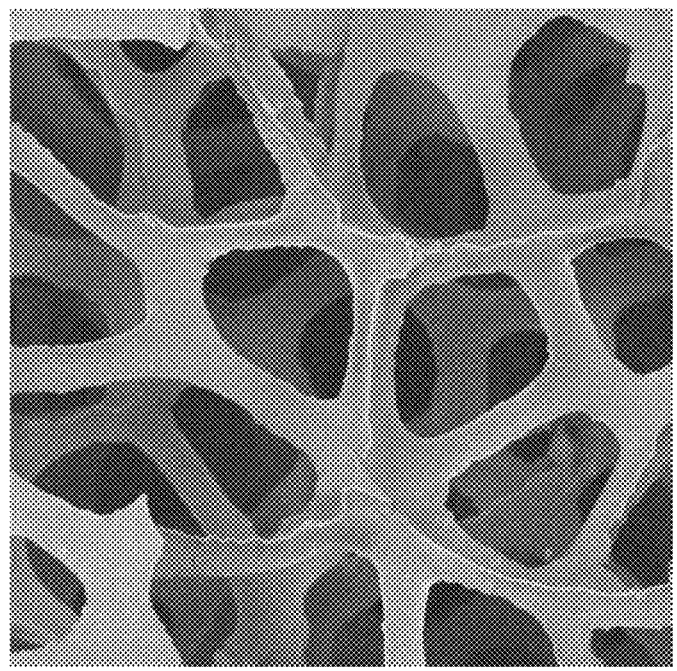

The constituent graphene planes of a graphite crystallite in a natural or artificial graphite particle can be exfoliated and extracted or isolated to obtain individual graphene sheets of hexagonal carbon atoms, which are single-atom thick, provided the inter-planar van der Waals forces can be overcome. An isolated, individual graphene plane of carbon atoms is commonly referred to as single-layer graphene. A stack of multiple graphene planes bonded through van der Waals forces in the thickness direction with an inter-graphene plane spacing of approximately 0.3354 nm is commonly referred to as a multi-layer graphene. A multi-layer graphene platelet has up to 300 layers of graphene planes (<100 nm in thickness), but more typically up to 30 graphene planes (<10 nm in thickness), even more typically up to 20 graphene planes (<7 nm in thickness), and most typically up to 10 graphene planes (commonly referred to as few-layer graphene in scientific community). Single-layer graphene and multi-layer graphene sheets are collectively called "nano graphene platelets" (NGPs), as shown in FIG. 2. Graphene sheets/platelets (collectively, NGPs) are a new class of carbon nano material (a 2-D nano carbon) that is distinct from the 0-D fullerene, the 1-D CNT or CNF, and the 3-D graphite. For the purpose of defining the claims and as is commonly understood in the art, a graphene material (isolated graphene sheets) is not (and does not include) a carbon nanotube (CNT) or a carbon nano-fiber (CNF).

Our research group pioneered the development of graphene materials and related production processes as early as 2002: (1) B. Z. Jang and W. C. Huang, "Nano-scaled Graphene Plates," U.S. Pat. No. 7,071,258 (Jul. 4, 2006), application submitted on Oct. 21, 2002; (2) B. Z. Jang, et al. "Process for Producing Nano-scaled Graphene Plates," U.S. patent application Ser. No. 10/858,814 (Jun. 3, 2004); and (3) B. Z. Jang, A. Zhamu, and J. Guo, "Process for Producing Nano-scaled Platelets and Nanocomposites," U.S. patent application Ser. No. 11/509,424 (Aug. 25, 2006).

Figure 4A:
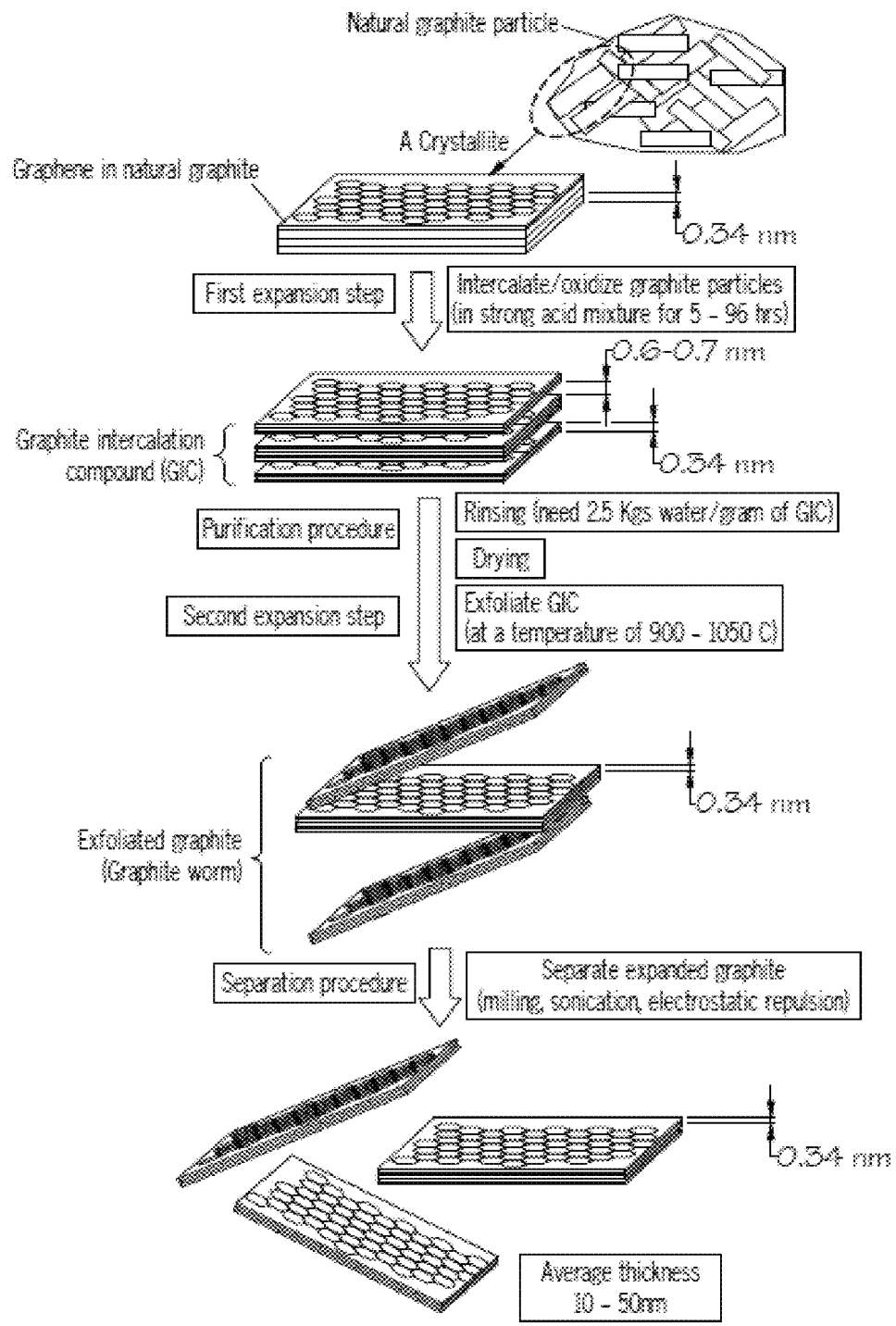
FIG. 4(A) Schematic of a commonly used process for producing exfoliated graphite, expanded graphite flakes (thickness >100 nm), and graphene sheets (thickness <100 nm, more typically <10 nm, and can be as thin as 0.34 nm).
Figure 4:
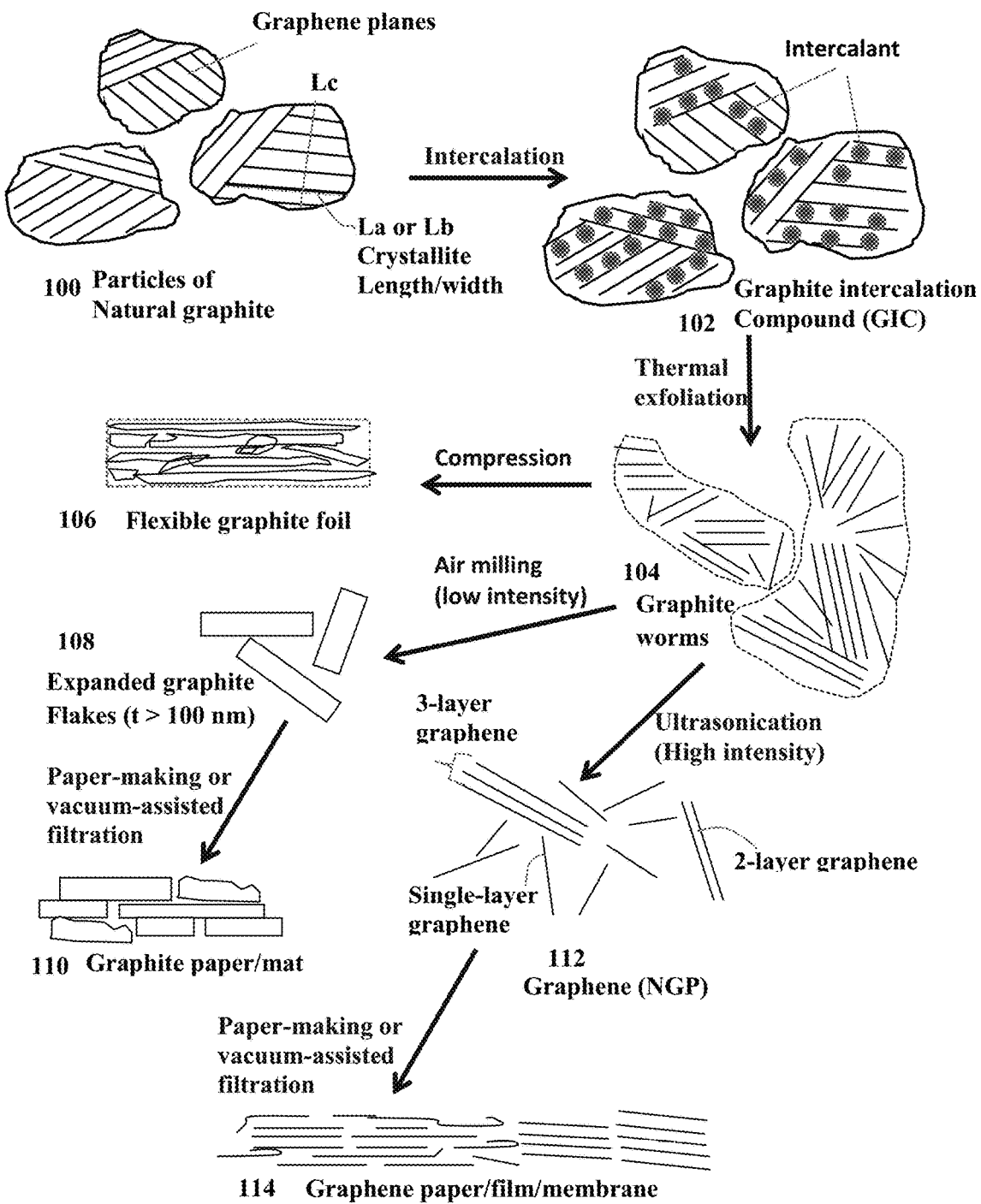
FIG. 4(B) Schematic drawing to illustrate the processes for producing exfoliated graphite, expanded graphite flakes, and isolated graphene sheets.

In one process, graphene materials are obtained by intercalating natural graphite particles with a strong acid and/or an oxidizing agent to obtain a graphite intercalation compound (GIC) or graphite oxide (GO), as illustrated in FIG. 4(A) and FIG. 4(B) (schematic drawings). The presence of chemical species or functional groups in the interstitial spaces between graphene planes in a GIC or GO serves to increase the inter-graphene spacing ($d_{002}$, as determined by X-ray diffraction), thereby significantly reducing the van der Waals forces that otherwise hold graphene planes together along the c-axis direction. The GIC or GO is most often produced by immersing natural graphite powder (100 in FIG. 4(B)) in a mixture of sulfuric acid, nitric acid (an oxidizing agent), and another oxidizing agent (e.g. potassium permanganate or sodium perchlorate). The resulting GIC (102) is actually some type of graphite oxide (GO) particles if an oxidizing agent is present during the intercalation procedure. This GIC or GO is then repeatedly washed and rinsed in water to remove excess acids, resulting in a graphite oxide suspension or dispersion, which contains discrete and visually discernible graphite oxide particles dispersed in water. In order to produce graphene materials, one can follow one of the two processing routes after this rinsing step, briefly described below:

Route 1 involves removing water from the suspension to obtain "expandable graphite," which is essentially a mass of dried GIC or dried graphite oxide particles. Upon exposure of expandable graphite to a temperature in the range of typically 800-1,050° C. for approximately 30 seconds to 2 minutes, the GIC undergoes a rapid volume expansion by a factor of 30-300 to form "graphite worms" (104), which are each a collection of exfoliated, but largely un-separated graphite flakes that remain interconnected.

In Route 1A, these graphite worms (exfoliated graphite or "networks of interconnected/non-separated graphite flakes") can be re-compressed to obtain flexible graphite sheets or foils (106) that typically have a thickness in the range of 0.1 mm (100 μm)-0.5 mm (500 μm). Alternatively, one may choose to use a low-intensity air mill or shearing machine to simply break up the graphite worms for the purpose of producing the so-called "expanded graphite flakes" (108) which contain mostly graphite flakes or platelets thicker than 100 nm (hence, not a nano material by definition).

In Route 1B, the exfoliated graphite is subjected to high-intensity mechanical shearing (e.g. using an ultrasonicator, high-shear mixer, high-intensity air jet mill, or high-energy ball mill) to form separated single-layer and multi-layer graphene sheets (collectively called NGPs, 112), as disclosed in our U.S. application Ser. No. 10/858,814 (Jun. 3, 2004). Single-layer graphene can be as thin as 0.34 nm, while multi-layer graphene can have a thickness up to 100 nm, but more typically less than 10 nm (commonly referred to as few-layer graphene). Multiple graphene sheets or platelets may be made into a sheet of NGP paper using a paper-making process. This sheet of NGP paper is an example of the porous graphene structure layer utilized in the presently invented process.

Route 2 entails ultrasonicating the graphite oxide suspension (e.g. graphite oxide particles dispersed in water) for the purpose of separating/isolating individual graphene oxide sheets from graphite oxide particles. This is based on the notion that the inter-graphene plane separation bas been increased from 0.3354 nm in natural graphite to 0.6-1.1 nm in highly oxidized graphite oxide, significantly weakening the van der Waals forces that hold neighboring planes together. Ultrasonic power can be sufficient to further separate graphene plane sheets to form fully separated, isolated, or discrete graphene oxide (GO) sheets. These graphene oxide sheets can then be chemically or thermally reduced to obtain "reduced graphene oxides" (RGO) typically having an oxygen content of 0.001%-10% by weight, more typically 0.01%-5% by weight, most typically and preferably less than 2% by weight of oxygen.

For the purpose of defining the claims of the instant application, NGPs or graphene materials include discrete sheets/platelets of single-layer and multi-layer (typically less than 10 layers) pristine graphene, graphene oxide, reduced graphene oxide (RGO), graphene fluoride, graphene chloride, graphene bromide, graphene iodide, hydrogenated graphene, nitrogenated graphene, chemically functionalized graphene, doped graphene (e.g. doped by B or N). Pristine graphene has essentially 0% oxygen. RGO typically has an oxygen content of 0.001%-5% by weight. Graphene oxide (including RGO) can have 0.001%-50% by weight of oxygen. Other than pristine graphene, all the graphene materials have 0.001%-50% by weight of non-carbon elements (e.g. O, H, N, B, F, Cl, Br, I, etc.). These materials are herein referred to as non-pristine graphene materials.

Pristine graphene, in smaller discrete graphene sheets (typically 0.3 μm to 10 μm), may be produced by direct ultrasonication (also known as liquid phase exfoliation or production) or supercritical fluid exfoliation of graphite particles. These processes are well-known in the art.

The graphene oxide (GO) may be obtained by immersing powders or filaments of a starting graphitic material (e.g. natural graphite powder) in an oxidizing liquid medium (e.g. a mixture of sulfuric acid, nitric acid, and potassium permanganate) in a reaction vessel at a desired temperature for a period of time (typically from 0.5 to 96 hours, depending upon the nature of the starting material and the type of oxidizing agent used). As previously described above, the resulting graphite oxide particles may then be subjected to thermal exfoliation or ultrasonic wave-induced exfoliation to produce isolated GO sheets. These GO sheets can then be converted into various graphene materials by substituting —OH groups with other chemical groups (e.g. —Br, $NH_2$, etc.).

Fluorinated graphene or graphene fluoride is herein used as an example of the halogenated graphene material group. There are two different approaches that have been followed to produce fluorinated graphene: (1) fluorination of pre-synthesized graphene: This approach entails treating graphene prepared by mechanical exfoliation or by CVD growth with fluorinating agent such as $XeF_2$, or F-based plasmas; (2) Exfoliation of multilayered graphite fluorides: Both mechanical exfoliation and liquid phase exfoliation of graphite fluoride can be readily accomplished.

Interaction of $F_2$ with graphite at high temperature leads to covalent graphite fluorides $(CO)_n$ or $(C_2F)_n$, while at low temperatures graphite intercalation compounds (GIC) $C_xF$ ($2 \leq x \leq 24$) form. In $(CF)_n$, carbon atoms are sp3-hybridized and thus the fluorocarbon layers are corrugated consisting of trans-linked cyclohexane chairs. In $(C_2F)_n$ only half of the C atoms are fluorinated and every pair of the adjacent carbon sheets are linked together by covalent C-C bonds. Systematic studies on the fluorination reaction showed that the resulting F/C ratio is largely dependent on the fluorination temperature, the partial pressure of the fluorine in the fluorinating gas, and physical characteristics of the graphite precursor, including the degree of graphitization, particle size, and specific surface area. In addition to fluorine ($F_2$), other fluorinating agents may be used, although most of the available literature involves fluorination with $F_2$ gas, sometimes in presence of fluorides.

For exfoliating a layered precursor material to the state of individual layers or few-layers, it is necessary to overcome the attractive forces between adjacent layers and to further stabilize the layers. This may be achieved by either covalent modification of the graphene surface by functional groups or by non-covalent modification using specific solvents, surfactants, polymers, or donor-acceptor aromatic molecules. The process of liquid phase exfoliation includes ultra-sonic treatment of a graphite fluoride in a liquid medium.

The nitrogenation of graphene can be conducted by exposing a graphene material, such as graphene oxide, to ammonia at high temperatures (200-400° C.). Nitrogenated graphene could also be formed at lower temperatures by a hydrothermal method; e.g. by sealing GO and ammonia in an autoclave and then increased the temperature to 150-250° C. Other methods to synthesize nitrogen doped graphene include nitrogen plasma treatment on graphene, arc-discharge between graphite electrodes in the presence of ammonia, ammonolysis of graphene oxide under CVD conditions, and hydrothermal treatment of graphene oxide and urea at different temperatures.

The aforementioned features are further described and explained in detail as follows: As illustrated in FIG. 4(B), a graphite particle (e.g. 100) is typically composed of multiple graphite crystallites or grains. A graphite crystallite is made up of layer planes of hexagonal networks of carbon atoms.

These layer planes of hexagonally arranged carbon atoms are substantially flat and are oriented or ordered so as to be substantially parallel and equidistant to one another in a particular crystallite. These layers of hexagonal-structured carbon atoms, commonly referred to as graphene layers or basal planes, are weakly bonded together in their thickness direction (crystallographic c-axis direction) by weak van der Waals forces and groups of these graphene layers are arranged in crystallites. The graphite crystallite structure is usually characterized in terms of two axes or directions: the c-axis direction and the a-axis (or b-axis) direction. The c-axis is the direction perpendicular to the basal planes. The a- or b-axes are the directions parallel to the basal planes (perpendicular to the c-axis direction).

A highly ordered graphite particle can consist of crystallites of a considerable size, having a length of $L_a$ along the crystallographic a-axis direction, a width of $L_b$ along the crystallographic b-axis direction, and a thickness $L_c$ along the crystallographic c-axis direction. The constituent graphene planes of a crystallite are highly aligned or oriented with respect to each other and, hence, these anisotropic structures give rise to many properties that are highly directional. For instance, the thermal and electrical conductivity of a crystallite are of great magnitude along the plane directions (a- or b-axis directions), but relatively low in the perpendicular direction (c-axis). As illustrated in the upper-left portion of FIG. 4(B), different crystallites in a graphite particle are typically oriented in different directions and, hence, a particular property of a multi-crystallite graphite particle is the directional average value of all the constituent crystallites.

Due to the weak van der Waals forces holding the parallel graphene layers, natural graphite can be treated so that the spacing between the graphene layers can be appreciably opened up so as to provide a marked expansion in the c-axis direction, and thus form an expanded graphite structure in which the laminar character of the carbon layers is substantially retained. The process for manufacturing flexible graphite is well-known in the art. In general, flakes of natural graphite (e.g. 100 in FIG. 4(B)) are intercalated in an acid solution to produce graphite intercalation compounds (GICs, 102). The GICs are washed, dried, and then exfoliated by exposure to a high temperature for a short period of time. This causes the flakes to expand or exfoliate in the c-axis direction of the graphite up to 80-300 times of their original dimensions. The exfoliated graphite flakes are vermiform in appearance and, hence, are commonly referred to as graphite worms 104. These worms of graphite flakes which have been greatly expanded can be formed without the use of a binder into cohesive or integrated sheets of expanded graphite, e.g. webs, papers, strips, tapes, foils, mats or the like (typically referred to as "flexible graphite" 106) having a typical density of about 0.04-2.0 g/cm$^3$ for most applications.

Acids, such as sulfuric acid, are not the only type of intercalating agent (intercalant) that penetrate into spaces between graphene planes to obtain GICs. Many other types of intercalating agents, such as alkali metals (Li, K, Na, Cs, and their alloys or eutectics), can be used to intercalate graphite to stage 1, stage 2, stage 3, etc. Stage n implies one intercalant layer for every n graphene planes. For instance, a stage-1 potassium-intercalated GIC means there is one layer of K for every graphene plane; or, one can find one layer of K atoms inserted between two adjacent graphene planes in a G/K/G/K/KG . . . sequence, where G is a graphene plane and K is a potassium atom plane. A stage-2 GIC will have a sequence of GG/K/GG/K/GG/K/GG and a stage-3 GIC will have a sequence of GGG/K/GGG/K/GGG . . . , etc. These GICs can then be brought in contact with water or water-alcohol mixture to produce exfoliated graphite and/or separated/isolated graphene sheets.

Exfoliated graphite worms may be subjected to high-intensity mechanical shearing/separation treatments using a high-intensity air jet mill, high-intensity ball mill, or ultrasonic device to produce separated nano graphene platelets (NGPs) with all the graphene platelets thinner than 100 nm, mostly thinner than 10 nm, and, in many cases, being single-layer graphene (also illustrated as 112 in FIG. 4(B)). An NGP is composed of a graphene sheet or a plurality of graphene sheets with each sheet being a two-dimensional, hexagonal structure of carbon atoms. A mass of multiple NGPs (including discrete sheets/platelets of single-layer and/or few-layer graphene or graphene oxide may be made into a graphene film/paper (114 in FIG. 4(B)) using a film- or paper-making process. Alternatively, with a low-intensity shearing, graphite worms tend to be separated into the so-called expanded graphite flakes (108 in FIG. 4(B) having a thickness >100 nm. These flakes can be formed into graphite paper or mat 106 using a paper- or mat-making process, with or without a resin binder.

Despite the fact that individual graphene sheets have an exceptionally high specific surface area, graphene sheets have a great tendency to re-stack together or to overlap with one another, thereby dramatically reducing the specific capacitance due to the significantly reduced specific surface area that is accessible by the electrolyte. This tendency to re-stack is particularly acute during the supercapacitor cell electrode production process. In this process, graphene sheets, along with other conductive additive and resin binder (e.g. PVDF), are dispersed in a solvent (typically NMP) to form a slurry, which is then coated on a surface of a solid current collector (e.g. Al foil). The solvent is then removed (vaporized) to form a dried layer of active material electrode, which is then fed through a pair of rollers in a compression machine to consolidate the electrode layer. These drying and compressing procedures induce severe graphene re-stacking. In many of the scientific reports, even though the graphene sheets in an original powder form were found to exhibit an exceptionally high specific surface area, the resulting electrode only shows an unexpectedly lower specific capacitance. Theoretically, the maximum specific capacitance of a single-layer graphene-based supercapacitor is as high as 550 F/g (based on an EDLC structure, no redox pair or pseudo-capacitance), but experimentally achieved values have been in the range of mere 90-170 F/g. This has been a long-standing problem in the art of supercapacitors.

The present invention provides a highly innovative and elegant process to overcome this graphene sheet re-stacking issue. This invented process completely eliminates the need to go through slurry coating, drying, and compressing procedures. Instead of forming a slurry containing an environmentally undesirable solvent (i.e. NMP), the process entails dispersing graphene sheets in a liquid electrolyte to form a slurry of electrode active material-liquid electrolyte mixture. This mixture slurry is then injected into pores of a conductive foam-based current collector; no subsequent drying and compressing are required and no or little possibility of graphene sheets re-stacking together. Furthermore, graphene sheets are already pre-dispersed in a liquid electrolyte, implying that essentially all graphene surfaces are naturally accessible to the electrolyte, leaving behind no "dry pockets". This process also enables us to pack graphene sheets (with electrolyte in between) in a highly compact manner, giving rise to an unexpectedly high electrode active material tap density.

The graphene sheets used in the aforementioned process may be subjected to the following treatments, separately or in combination:

(a) Being chemically functionalized or doped with atomic, ionic, or molecular species. Useful surface functional groups may include quinone, hydroquinone, quaternized aromatic amines, mercaptans, or disulfides. This class of functional groups can impart pseudo-capacitance to graphene-based supercapacitors.

(b) coated or grafted with an intrinsically conductive polymer (conducting polymers, such as polyacetylene, polypyrrole, polyaniline, polythiophene, and their derivatives, are good choices for use in the present invention); These treatments are intended for further increasing the capacitance value through pseudo-capacitance effects such as redox reactions.

(c) deposition with transition metal oxides or sulfides, such as $RuO_2$, $TiO_2$, $MnO_2$, $Cr_2O_3$, and $Co_2O_3$, for the purpose of forming redox pairs with graphene sheets, thereby imparting pseudo-capacitance to the electrode; and (d) subjected to an activation treatment (analogous to activation of carbon black materials) to create additional surfaces and possibly imparting functional chemical groups to these surfaces. The activation treatment can be accomplished through $CO_2$ physical activation, KOH chemical activation, or exposure to nitric acid, fluorine, or ammonia plasma.

We have discovered that a wide variety of two-dimensional (2D) inorganic materials can be used in the presently invented supercapacitors prepared by the invented active material-electrolyte mixture impregnation process. Layered materials represent a diverse source of 2D systems that can exhibit unexpected electronic properties and high specific surface areas that are important for supercapacitor applications. Although graphite is the best known layered material, transition metal dichalcogenides (TMDs), transition metal oxides (TMOs), and a broad array of other compounds, such as BN, $Bi_2Te_3$, and $Bi_2Se_3$, are also potential sources of 2D materials.

Non-graphene 2D nano materials, single-layer or few-layer (up to 20 layers), can be produced by several methods: mechanical cleavage, laser ablation (e.g. using laser pulses to ablate TMDs down to a single layer), liquid phase exfoliation, and synthesis by thin film techniques, such as PVD (e.g. sputtering), evaporation, vapor phase epitaxy, liquid phase epitaxy, chemical vapor epitaxy, molecular beam epitaxy (MBE), atomic layer epitaxy (ALE), and their plasma-assisted versions.

We have surprisingly discovered that most of these inorganic materials, when in a 2D nano-disc, nano-platelet, nano-belt, or nano-ribbon form, exhibit remarkable EDLC values, even though these inorganic materials are normally considered as electrically non-conducting and, hence, not a candidate supercapacitor electrode material. The supercapacitance values are exceptionally high when these 2D nano materials are used in combination with a small amount of nano graphene sheets (particularly single-layer graphene). The required single-layer graphene can be from 0.1% to 50% by weight, more preferably from 0.5% to 25%, and most preferably from 1% to 15% by weight.

In the instant invention, there is no limitation on the type of liquid electrolytes that can be used in the supercapacitor: aqueous, organic, gel, and ionic liquid. Typically, electrolytes for supercapacitors consist of solvent and dissolved chemicals (e.g. salts) that dissociate into positive ions (cations) and negative ions (anions), making the electrolyte electrically conductive. The more ions the electrolyte contains, the better its conductivity, which also influences the capacitance. In supercapacitors, the electrolyte provides the molecules for the separating monolayer in the Helmholtz double-layer (electric double layer) and delivers the ions for pseudo-capacitance.

Water is a relatively good solvent for dissolving inorganic chemicals. When added together with acids such as sulfuric acid ($H_2SO_4$), alkalis such as potassium hydroxide (KOH), or salts such as quaternary phosphonium salts, sodium perchlorate ($NaClO_4$), lithium perchlorate ($LiClO_4$) or lithium hexafluoride arsenate ($LiAsF_6$), water offers relatively high conductivity values. Aqueous electrolytes have a dissociation voltage of 1.15 V per electrode and a relatively low operating temperature range. Water electrolyte-based supercapacitors exhibit low energy density.

Alternatively, electrolytes may contain organic solvents, such as acetonitrile, propylene carbonate, tetrahydrofuran, diethyl carbonate, y-butyrolactone, and solutes with quaternary ammonium salts or alkyl ammonium salts such as tetraethylammonium tetrafluoroborate ($N(Et)_4BF_4$) or triethyl (metyl) tetrafluoroborate ($NMe(EO_3BF_4)$. Organic electrolytes are more expensive than aqueous electrolytes, but they have a higher dissociation voltage of typically 1.35 V per electrode (2.7 V capacitor voltage), and a higher temperature range. The lower electrical conductivity of organic solvents (10 to 60 mS/cm) leads to a lower power density, but a higher energy density since the energy density is proportional to the square of the voltage.

The ionic liquid is composed of ions only. Ionic liquids are low melting temperature salts that are in a molten or liquid state when above a desired temperature. For instance, a salt is considered as an ionic liquid if its melting point is below 100° C. If the melting temperature is equal to or lower than room temperature (25° C.), the salt is referred to as a room temperature ionic liquid (RTIL). The IL salts are characterized by weak interactions, due to the combination of a large cation and a charge-delocalized anion. This results in a low tendency to crystallize due to flexibility (anion) and asymmetry (cation).

A typical and well-known ionic liquid is formed by the combination of a 1-ethyl-3-methylimidazolium (EMI) cation and an N,N-bis(trifluoromethane)sulphonamide (TFSI) anion. This combination gives a fluid with an ionic conductivity comparable to many organic electrolyte solutions and a low decomposition propensity and low vapor pressure up to ~300-400° C. This implies a generally low volatility and non-flammability and, hence, a much safer electrolyte for batteries.

Ionic liquids are basically composed of organic ions that come in an essentially unlimited number of structural variations owing to the preparation ease of a large variety of their components. Thus, various kinds of salts can be used to design the ionic liquid that has the desired properties for a given application. These include, among others, imidazolium, pyrrolidinium and quaternary ammonium salts as cations and bis(trifluoromethanesulphonyl) imide, bis(fluorosulphonyl)imide, and hexafluorophosphate as anions. Based on their compositions, ionic liquids come in different classes that basically include aprotic, protic and zwitterionic types, each one suitable for a specific application.

Common cations of room temperature ionic liquids (RTILs) include, but not limited to, tetraalkylammonium, di-, tri-, and tetra-alkylimidazolium, alkylpyridinium, dialkyl-pyrrolidinium, dialkylpiperidinium, tetraalkylphosphonium, and trialkylsulfonium. Common anions of RTILs include, but not limited to, $BF_4^-$, $B(CN)_4^-$, $CH_3BF_3^-$, $CH2CHBF_3^-$, $CF_3BF_3^-$, $C_2F_5BF_3^-$, $n\text{-}C_3F_7BF_3^-$, $n\text{-}C_4F_9BF_3^-$, $PF_6^-$, $CF_3CO_2^-$, $CF_3SO_3^-$, $N(SO_2CF_3)_2^-$, $N(COCF_3)(SO_2CF_3)^-$, $N(SO_2F)_2^-$, $N(CN)_2^-$, $C(CN)_3^-$, $SeCN^-$, $CuCl_2^-$, $AlCl_4^-$, $F(HF)_{2.3}^-$, etc. Relatively speaking, the combination of imidazolium- or sulfonium-based cations and complex halide anions such as $AlCl_4^-$, $BF_4^-$, $CF_3CO_2^-$, $CF_3SO_3^-$, $NTf_2^{-1}$, $^{N(SO}2F)_2^-$, or $F(HF)_{2.3}^-$ results in RTILs with good working conductivities.

RTILs can possess archetypical properties such as high intrinsic ionic conductivity, high thermal stability, low volatility, low (practically zero) vapor pressure, non-flammability, the ability to remain liquid at a wide range of temperatures above and below room temperature, high polarity, high viscosity, and wide electrochemical windows. These properties, except for the high viscosity, are desirable attributes when it comes to using an RTIL as an electrolyte ingredient (a salt and/or a solvent) in a supercapacitor.

In order to make a pseudo-capacitor (a supercapacitor that works on the development of pseudo-capacitance through redox pair formation), the anode active material or cathode active material may be designed to contain graphene sheets and a redox pair partner material selected from a metal oxide, a conducting polymer, an organic material, a non-graphene carbon material, an inorganic material, or a combination thereof. Many of the materials that can pair up with reduced graphene oxide sheets are well-known in the art. In this study, we have come to realize that graphene halogenide (e.g. graphene fluoride), graphene hydrogenide, and nitrogenated graphene can work with a wide variety of partner materials to form a redox pair for developing pseudo-capacitance.

For instance, the metal oxide or inorganic materials that serve in such a role include $RuO_2$, $IrO_2$, $NiO$, $MnO_2$, $VO_2$, $V_2O_5$, $V_3O_8$, $TiO_2$, $Cr_2O_3$, $Co_2O_3$, $Co_3O_4$, $PbO_2$, $Ag_2O$, $MoC_x$, $Mo_2N$, or a combination thereof. In general, the inorganic material may be selected from a metal carbide, metal nitride, metal boride, metal dichalcogenide, or a combination thereof. Preferably, the desired metal oxide or inorganic material is selected from an oxide, dichalcogenide, trichalcogenide, sulfide, selenide, or telluride of niobium, zirconium, molybdenum, hafnium, tantalum, tungsten, titanium, vanadium, chromium, cobalt, manganese, iron, or nickel in a nanowire, nano-disc, nano-ribbon, or nano platelet form. These materials can be in the form of a simple mixture with sheets of a graphene material, but preferably in a nano particle or nano coating form that that is physically or chemically bonded to a surface of the graphene sheets prior to being formed into a wet active material mixture (e.g. in a slurry form) and impregnated into the pores of the conductive porous layers.

The presently invented rope-shaped battery has many unique features and some of these features and advantages are summarized below:

By definition, a rope shape supercapacitor means a supercapacitor that contains at least a rod-shape or filament-shape anode and a rod-shape or filament-shape cathode combined into a braid or twist yarn. The supercapacitor has a length and a diameter or thickness wherein the aspect ratio (length-to-diameter or length-to-thickness ratio) is at least 10 and preferably at least 20. The rope-shaped supercapacitor can have a length greater than 1 m, or even greater than 100 m. The length can be as short as 1 μm, but typically from 10 μm to 10 m and more typically from micrometers to a few meters. Actually, there is no theoretical limitation on the length of this type of rope-shape supercapacitor.

The invented rope-shaped supercapacitor is so flexible that the supercapacitor can be easily bent to have a radius of curvature greater than 10 cm. The supercapacitor is bendable to substantially conform to the shape of a void or interior compartment in a vehicle. The void or interior compartment may be a trunk, door, hatch, spare tire compartment, area under seat or area under dashboard. The supercapacitor is removable from a vehicle and is bendable to conform to the shape of a different void or interior compartment.

One or more units of instant rope-shape supercapacitor can be incorporated into a garment, belt, carrying strap, luggage strap, weaponry strap, musical instrument strap, helmet, hat, boot, foot covering, glove, wrist covering, watch band, jewelry item, animal collar or animal harness.

One or more units of instant rope-shaped supercapacitor can be removably incorporated a garment, belt, carrying strap, luggage strap, weaponry strap, musical instrument strap, helmet, hat, boot, foot covering, glove, wrist covering, watch band, jewelry item, animal collar or animal harness.

Additionally, the invented rope supercapacitor conforms to the interior radius of a hollow bicycle frame.

In what follows, we provide examples for a large number of different types of anode active materials, cathode active materials, and conductive porous rods (e.g. graphite foam, graphene foam, and metal foam) to illustrate the best mode of practicing the instant invention. Theses illustrative examples and other portions of instant specification and drawings, separately or in combinations, are more than adequate to enable a person of ordinary skill in the art to practice the instant invention. However, these examples should not be construed as limiting the scope of instant invention.

EXAMPLE 1

Illustrative Examples of Electronically Conductive Porous Rods or Filaments as a Porous Current Collector to Accommodate an Active Material-electrolyte Mixture Various types of metal foams, carbon foams, and fine metal webs are commercially available for use as conductive porous rods (serving as a current collector) in an anode or cathode; e.g. Ni foam, Cu foam, Al foam, Ti foam, Ni mesh/web, stainless steel fiber mesh, etc. Metal-coated polymer foams and carbon foams can also be used as current collectors. For making macroscopic rope-shaped flexible and shape-conformable supercapacitors, the most desirable thickness/diameter ranges for these conductive porous rods are 50-1000 μm, preferably 100-800 μm, more preferably 200-600 μm. For making microscopic rope-shape supercapacitors (having a diameter from 100 nm to 100 μm, for instance), graphene foams, graphene aerogel foam, porous carbon fibers (e.g. made by electro-spinning polymer fibers, carbonizing the polymer fibers, and activating the resulting carbon fibers), and porous graphite fibers can be used to accommodate an electrode active material-electrolyte mixture.

EXAMPLE 2

Ni foam and CVD Graphene Foam-based Porous Rods Supported on Ni Foam Templates

The procedure for producing CVD graphene foam was adapted from that disclosed in open literature: Chen, Z. et al.

"Three-dimensional flexible and conductive interconnected graphene networks grown by chemical vapor deposition," Nature Materials, 10, 424-428 (2011). Nickel foam, a porous structure with an interconnected 3D scaffold of nickel was chosen as a template for the growth of graphene foam. Briefly, carbon was introduced into a nickel foam by decomposing $CH_4$ at 1,000° C. under ambient pressure, and graphene films were then deposited on the surface of the nickel foam. Due to the difference in the thermal expansion coefficients between nickel and graphene, ripples and wrinkles were formed on the graphene films. Four types of foams made in this example were used as a current collector in the presently invented lithium batteries: Ni foam, CVD graphene-coated Ni form, CVD graphene foam (Ni being etched away), and conductive polymer bonded CVD graphene foam.

In order to recover (separate) graphene foam from the supporting Ni foam, Ni frame was etched away. In the procedure proposed by Chen, et al., before etching away the nickel skeleton by a hot HCl (or $FeCl_3$) solution, a thin layer of poly (methyl methacrylate) (PMMA) was deposited on the surface of the graphene films as a support to prevent the graphene network from collapsing during nickel etching. After the PMMA layer was carefully removed by hot acetone, a fragile graphene foam sample was obtained. The use of the PMMA support layer was considered critical to preparing a free-standing film of graphene foam. Instead, a conducting polymer was used as a binder resin to hold graphene together while Ni was etched away. The graphene foam or Ni foam thickness/diameter range was from 35 μm to 600 μm.

The Ni foam or the CVD graphene foam used herein is intended as conductive porous rods (CPR) to accommodate the ingredients (anode or cathode active material +optional conductive additive +liquid electrolyte) for the anode or cathode or both. For instance, pre-lithiated Si nano particles (as an anode active material for a lithium-ion capacitor) dispersed in an organic liquid electrolyte (e.g. 1-5.5 M of $LiPF_6$ dissolved in PC-EC) were made into gel-like mass, which was delivered to a porous surface of a Ni foam continuously fed from a feeder roller to make an anode electrode (as in Schematic A of FIG. 1(D)).

Graphene sheets (300-750 nm long) dispersed in the same liquid electrolyte were made into cathode slurry, which was sprayed over porous surfaces of a continuous Ni foam rod to form a cathode electrode. A porous foam rod containing pre-lithiated Si nano particle-electrolyte mixture impregnated into the foam pores (the first electrode) was wrapped around by a porous separator layer (porous PE-PP copolymer). The two electrodes were then combined into a twist yarn and then encased in a thin polymer sheath to obtain a rope-shape lithium-ion capacitor.

On a separate basis, a mixture of isolated graphene sheets and a liquid electrolyte was impregnated into pores of a rod of graphene foam, which was then wrapped around with a separator film to make one electrode. Another electrode of the same porous rod and same mixture was made in a similar manner. The two rods were then combined to make a twist yarn, which was then encased in a plastic sheath.

EXAMPLE 3

Graphitic Foam-Based Conductive Porous Rods from Pitch-Based Carbon Foams

Pitch powder, granules, or pellets are placed in a aluminum mold with the desired final shape of the foam. Mitsubishi ARA-24 meso-phase pitch was utilized. The sample is evacuated to less than 1 torr and then heated to a temperature approximately 300° C. At this point, the vacuum was released to a nitrogen blanket and then a pressure of up to 1,000 psi was applied. The temperature of the system was then raised to 800° C. This was performed at a rate of 2 degree C/min. The temperature was held for at least 15 minutes to achieve a soak and then the furnace power was turned off and cooled to room temperature at a rate of approximately 1.5 degree C/min with release of pressure at a rate of approximately 2 psi/min. Final foam temperatures were 630° C. and 800° C. During the cooling cycle, pressure is released gradually to atmospheric conditions. The foam was then heat treated to 1050° C. (carbonized) under a nitrogen blanket and then heat treated in separate runs in a graphite crucible to 2500° C. and 2800° C. (graphitized) in Argon. The graphite foam rods were available in a thickness range of 75-500 μm.

EXAMPLE 4

Preparation of Graphene Oxide (GO) and Reduced Graphene Oxide (RGO) Nano Sheets from Natural Graphite Powder Natural graphite from Huadong Graphite Co. (Qingdao, China) was used as the starting material. GO was obtained by following the well-known modified Hummers method, which involved two oxidation stages. In a typical procedure, the first oxidation was achieved in the following conditions: 1100 mg of graphite was placed in a 1000 mL boiling flask. Then, 20 g of $K_2S_2O_8$, 20 g of $P_2O_5$, and 400 mL of a concentrated aqueous solution of $H_2SO_4$ (96%) were added in the flask. The mixture was heated under reflux for 6 hours and then let without disturbing for 20 hours at room temperature. Oxidized graphite was filtered and rinsed with abundant distilled water until neutral pH. A wet cake-like material was recovered at the end of this first oxidation.

For the second oxidation process, the previously collected wet cake was placed in a boiling flask that contains 69 mL of a concentrated aqueous solution of $H_2SO_4$ (96%). The flask was kept in an ice bath as 9 g of $KMnO_4$ was slowly added. Care was taken to avoid overheating. The resulting mixture was stirred at 35° C. for 2 hours (the sample color turning dark green), followed by the addition of 140 mL of water. After 15 min, the reaction was halted by adding 420 mL of water and 15 mL of an aqueous solution of 30 wt % $H_2O_2$. The color of the sample at this stage turned bright yellow. To remove the metallic ions, the mixture was filtered and rinsed with a 1:10 HCl aqueous solution. The collected material was gently centrifuged at 2700 g and rinsed with deionized water. The final product was a wet cake that contained 1.4 wt % of GO, as estimated from dry extracts. Subsequently, liquid dispersions of GO sheets were obtained by lightly sonicating wet-cake materials, which were diluted in deionized water.

Surfactant-stabilized RGO (RGO-BS) was obtained by diluting the wet-cake in an aqueous solution of surfactants instead of pure water. A commercially available mixture of cholate sodium (50 wt. %) and deoxycholate sodium (50 wt. %) salts provided by Sigma Aldrich was used. The surfactant weight fraction was 0.5 wt. %. This fraction was kept constant for all samples. Sonication was performed using a Branson Sonifier S-250A equipped with a 13 mm step disruptor horn and a 3 mm tapered micro-tip, operating at a 20 kHz frequency. For instance, 10 mL of aqueous solutions containing 0.1 wt. % of GO was sonicated for 10 min and subsequently centrifuged at 2700 g for 30 min to remove any non-dissolved large particles, aggregates, and impurities. Chemical reduction of as-obtained GO to yield RGO was conducted by following the method, which involved placing 10 mL of a 0.1 wt. % GO aqueous solution in a boiling flask of 50 mL. Then, 10 μL of a 35 wt. % aqueous solution of $N_2H_4$ (hydrazine) and 70 mL of a 28 wt. % of an aqueous solution of $NH_4OH$ (ammonia) were added to the mixture, which was stabilized by surfactants. The solution was heated to 90° C. and refluxed for 1 h. The pH value measured after the reaction was approximately 9. The color of the sample turned dark black during the reduction reaction.

RGO was used as an electrode active material (alone or with a redox pair partner material) in either or both of the anode and cathode in several of presently invented supercapacitors. The wet anode active-electrolyte mixture and cathode active material-electrolyte mixtures were separately delivered to surfaces of graphite foams for forming an anode and a cathode, respectively. A rope-shape battery was then fabricated, wherein one filamentary electrode (e.g. an anode) and one filamentary electrode (a cathode) were combined to form a braid, twist yarn, and the like.

For comparison purposes, slurry coating and drying procedures were conducted to produce conventional electrodes. Electrodes and a separator disposed between two dried electrodes were then assembled and encased in an Al-plastic laminated packaging envelop, followed by liquid electrolyte injection to form a conventional supercapacitor cell.

EXAMPLE 5

Preparation of Pristine Graphene Sheets (0% Oxygen)

Recognizing the possibility of the high defect population in GO sheets acting to reduce the conductivity of individual graphene plane, we decided to study if the use of pristine graphene sheets (non-oxidized and oxygen-free, non-halogenated and halogen-free, etc.) can lead to an active material having a high electrical and thermal conductivity for implementation in an electric double layer capacitor (EDLC supercapacitor). Pre-lithiated pristine graphene and pre-sodiated pristine graphene were also used as an anode active material for a lithium-ion capacitor and a sodium-ion capacitor, respectively. Pristine graphene sheets were produced by using the direct ultrasonication or liquid-phase production process.

In a typical procedure, five grams of graphite flakes, ground to approximately 20 μm or less in sizes, were dispersed in 1,000 mL of deionized water (containing 0.1% by weight of a dispersing agent, Zonyl® FSO from DuPont) to obtain a suspension. An ultrasonic energy level of 85 W (Branson 5450 Ultrasonicator) was used for exfoliation, separation, and size reduction of graphene sheets for a period of 15 minutes to 2 hours. The resulting graphene sheets are pristine graphene that have never been oxidized and are oxygen-free and relatively defect-free. Pristine graphene is essentially free from any non-carbon elements.

Pristine graphene sheets, along with an electrolyte, were incorporated in a supercapacitor using both the presently invented procedure and conventional procedure of slurry coating, drying and layer laminating.

EXAMPLE 6

Preparation of $MoS_2$/RGO Hybrid Material as a Cathode Active Material of a Pseudo-Supercapacitor A wide variety of inorganic materials were investigated in this example. For instance, an ultra-thin $MoS_2$/RGO hybrid was synthesized by a one-step solvothermal reaction of $(NH_4)_2MoS_4$ and hydrazine in an N, N-dimethylformamide (DMF) solution of oxidized graphene oxide (GO) at 200° C. In a typical procedure, 22 mg of $(NH_4)_2MoS_4$ was added to 10 mg of GO dispersed in 10 ml of DMF. The mixture was sonicated at room temperature for approximately 10 min until a clear and homogeneous solution was obtained. After that, 0.1 ml of $N_2H_4 \cdot H_2O$ was added. The reaction solution was further sonicated for 30 min before being transferred to a 40 mL Teflon-lined autoclave. The system was heated in an oven at 200° C. for 10 h. Product was collected by centrifugation at 8000 rpm for 5 min, washed with DI water and recollected by centrifugation. The washing step was repeated for at least 5 times to ensure that most DMF was removed. Finally, product was dried, mixed with liquid electrolyte to produce active cathode mixture slurry for impregnation into carbon foam.

EXAMPLE 7

Preparation of Graphene Fluoride (GF) Sheets as a Supercapacitor Active Material Several processes have been used by us to produce GF, but only one process is herein described as an example. In a typical procedure, highly exfoliated graphite (HEG) was prepared from intercalated compound $C_2F \cdot xClF_3$. HEG was further fluorinated by vapors of chlorine trifluoride to yield fluorinated highly exfoliated graphite (FHEG). Pre-cooled Teflon reactor was filled with 20-30 mL of liquid pre-cooled $ClF_3$, the reactor was closed and cooled to liquid nitrogen temperature. Then, no more than 1 g of HEG was put in a container with holes for $ClF_3$ gas to access and situated inside the reactor. In 7-10 days a gray-beige product with approximate formula $C_2F$ was formed.

Subsequently, a small amount of FHEG (approximately 0.5 mg) was mixed with 20-30 mL of an organic solvent (methanol and ethanol, separately) and subjected to an ultrasound treatment (280 W) for 30 min, leading to the formation of homogeneous yellowish dispersions. Upon removal of solvent, the dispersion became a brownish GF powder.

EXAMPLE 8

Preparation of Nitrogenataed Graphene Sheets as a Supercapacitor Electrode Active Material Graphene oxide (GO), synthesized in Example 2, was finely ground with different proportions of urea and the pelletized mixture heated in a microwave reactor (900 W) for 30 s. The product was washed several times with deionized water and vacuum dried. In this method graphene oxide gets simultaneously reduced and doped with nitrogen. The products obtained with graphene:urea mass ratios of 1:0.5, 1:1 and 1:2 are designated as NGO-1, NGO-2 and NGO-3 respectively and the nitrogen contents of these samples were 14.7, 18.2 and 17.5 wt % respectively as found by elemental analysis. These nitrogenataed graphene sheets remain dispersible in water. The resulting suspensions were then dried to obtain nitrogenated graphene powder. The powder was mixed in a liquid electrolyte to form a slurry for impregnation into pores of conductive porous rods/filaments.

EXAMPLE 9

Preparation of Two-dimensional (2D) Layered $Bi_2Se_3$ Chalcogenide Nanoribbons The preparation of (2D) layered $Bi_2Se_3$ chalcogenide nanoribbons is well-known in the art. For instance, $Bi_2Se_3$ nanoribbons were grown using the vapor-liquid-solid (VLS) method. Nanoribbons herein produced are, on average, 30-55 nm thick with widths and lengths ranging from hundreds of nanometers to several micrometers. Larger nanoribbons were subjected to ball-milling for reducing the lateral dimensions (length and width) to below 200 nm. Nanoribbons prepared by these procedures (with or without the presence of graphene sheets or exfoliated graphite flakes) were used as a supercapacitor electrode active material.

EXAMPLE 10

MXenes Powder+Chemically Activated RGO

Selected MXenes, were produced by partially etching out certain elements from layered structures of metal carbides such as $Ti_3AlC_2$. For instance, an aqueous 1 M $NH_4HF_2$ was used at room temperature as the etchant for $Ti_3AlC_2$. Typically, MXene surfaces are terminated by O, OH, and/or F groups, which is why they are usually referred to as $M_{n+1}X_nT_x$, where M is an early transition metal, X is C and/or N, T represents terminating groups (O, OH, and/or F), n=1, 2, or 3, and x is the number of terminating groups. The MXene materials investigated include $Ti_2CT_x$, $Nb_2CT_x$, $V_2CT_x$, $Ti_3CNT_x$, and $Ta_4C_3T_x$. Typically, 35-95% MXene and 5-65% graphene sheets were mixed in a liquid electrolyte and impregnated into pores of conductive porous filaments.

EXAMPLE 11

Preparation of $MnO_2$—Graphene Redox Pairs as a Pseudo-Capacitance Active Material The $MnO_2$ powder was synthesized by two methods (each with or without the presence of graphene sheets). In one method, a 0.1 mol/L $KMnO_4$ aqueous solution was prepared by dissolving potassium permanganate in deionized water. Meanwhile 13.32 g surfactant of high purity sodium bis(2-ethylhexyl) sulfosuccinate was added in 300mL iso-octane (oil) and stirred well to get an optically transparent solution. Then, 32.4mL of 0.1 mol/L $KMnO_4$ solution and selected amounts of GO solution were added in the solution, which was ultrasonicated for 30 min to prepare a dark brown precipitate. The product was separated, washed several times with distilled water and ethanol, and dried at 80° C. for 12 h. The sample is graphene-supported $MnO_2$ in a powder form, which was dispersed in a liquid electrolyte to form a slurry and impregnated into pores of a foamed current collector.

EXAMPLE 12

Evaluation of Various Supercapacitor Cells

In most of the examples investigated, both the inventive supercapacitor cells and their conventional counterparts were fabricated and evaluated. The latter cells, for comparison purposes, were prepared by the conventional procedures of slurry coating of electrodes, drying of electrodes, assembling of anode layer, separator, and cathode layer, packaging of assembled laminate, and injection of liquid electrolyte. In a conventional cell, an electrode (cathode or anode), is typically composed of 85% an electrode active material (e.g. graphene, activated carbon, inorganic nano discs, etc.), 5% Super-P (acetylene black-based conductive additive), and 10% PTFE, which were mixed and coated on Al foil. The thickness of electrode is around 100 μm. For each sample, both coin-size and pouch cells were assembled in a glove box. The capacity was measured with galvanostatic experiments using an Arbin SCTS electrochemical testing instrument. Cyclic voltammetry (CV) and electrochemical impedance spectroscopy (EIS) were conducted on an electrochemical workstation (CHI 660 System, USA).

Galvanostatic charge/discharge tests were conducted on the samples to evaluate the electrochemical performance. For the galvanostatic tests, the specific capacity (q) is calculated as $$q=I*t/m \qquad (1)$$

where I is the constant current in mA, t is the time in hours, and m is the cathode active material mass in grams. With voltage V, the specific energy (E) is calculated as, $$E=\int Vdq \qquad (2)$$

The specific power (P) can be calculated as $$P=(E/t) \; (W/kg) \qquad (3)$$

where t is the total charge or discharge step time in hours. The specific capacitance (C) of the cell is represented by the slope at each point of the voltage vs. specific capacity plot, $$C=dq/dV \qquad (4)$$

For each sample, several current density (representing charge/discharge rates) were imposed to determine the electrochemical responses, allowing for calculations of energy density and power density values required of the construction of a Ragone plot (power density vs. energy density).

Figure 5:
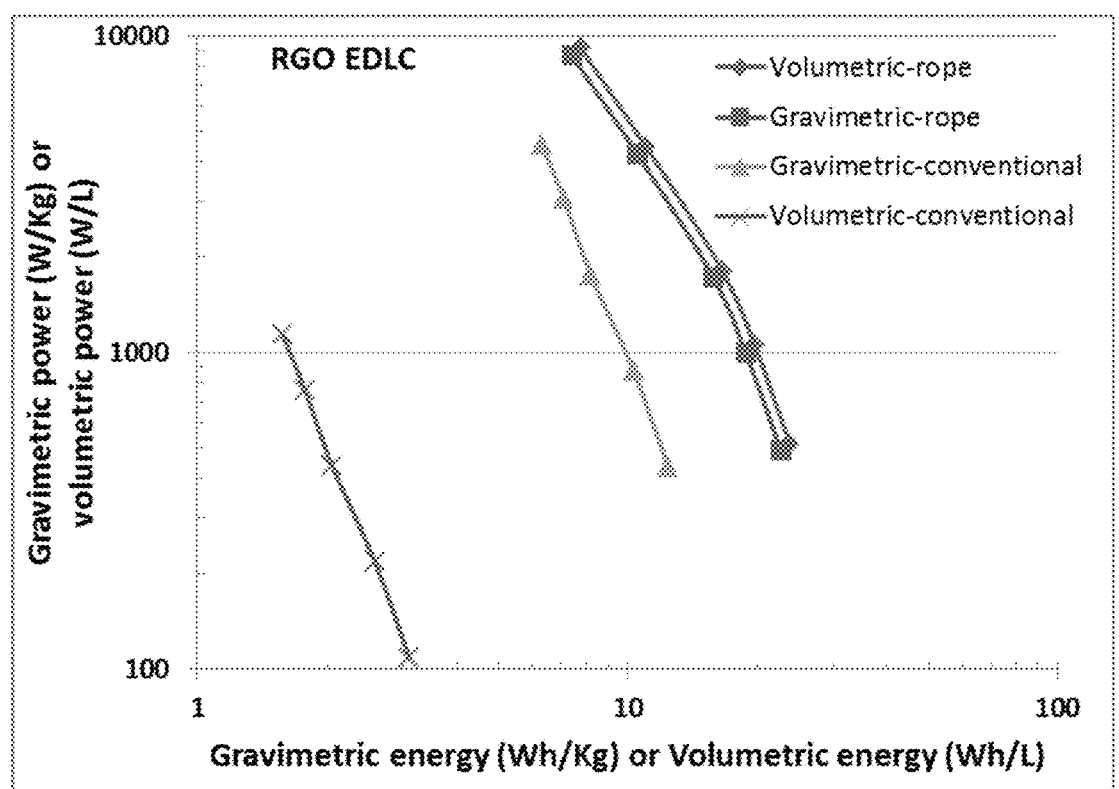
FIG. 5 Ragone plots (gravimetric and volumetric power density vs. energy density) of symmetric supercapacitor (EDLC) cells containing reduced graphene oxide (RGO) sheets as the electrode active material and $EMIMBF_4$ ionic liquid electrolyte. Data were obtained from both the rope-shape supercapacitors and, for comparison, prior art supercapacitors prepared by the conventional slurry coating of electrodes.

Shown in FIG. 5 are Ragone plots (gravimetric and volumetric power density vs. energy density) of two sets of symmetric supercapacitor (EDLC) cells containing reduced graphene oxide (RGO) sheets as the electrode active material and EMIMBF4 ionic liquid as the electrolyte. One of the two series of supercapacitors was prepared according to an embodiment of instant invention and the other was by the conventional slurry coating of electrodes. Several significant observations can be made from these data:

(A) Both the gravimetric and volumetric energy densities and power densities of the supercapacitor cells prepared by the presently invented method (rope-shape cells) are significantly higher than those of their counterparts prepared via the conventional method (denoted as "conventional"). The differences are highly dramatic and are mainly due to the high active material mass loading (>20 mg/cm$^2$) associated with the presently invented cells, reduced proportion of overhead (non-active) components relative to the active material weight/volume, no need to have a binder resin, the ability of the inventive method to more effectively pack graphene sheets into pores of the foamed current collector.

(B) For the cells prepared by the conventional method, the absolute magnitudes of the volumetric energy densities and volumetric power densities are significantly lower than those of their gravimetric energy densities and gravimetric power densities, due to the very low tap density (packing density of 0.25 g/cm³) of RGO-based electrodes prepared by the conventional slurry coating method.

(C) In contrast, for the cells prepared by the presently invented method, the absolute magnitudes of the volumetric energy densities (23.8 Wh/L) and volumetric power densities (9,156 W/L) are higher than those of their gravimetric energy densities and gravimetric power densities, due to the relatively high tap density (packing density of 1.05 g/cm³) of RGO-based electrodes prepared by the presently invented method.

(D) The volumetric energy densities and volumetric power densities of corresponding supercapacitors prepared by the conventional process are 3.1 Wh/L and 1,139 W/L, respectively, which are one order of magnitude lower. These are dramatic and unexpected.

Figure 6:
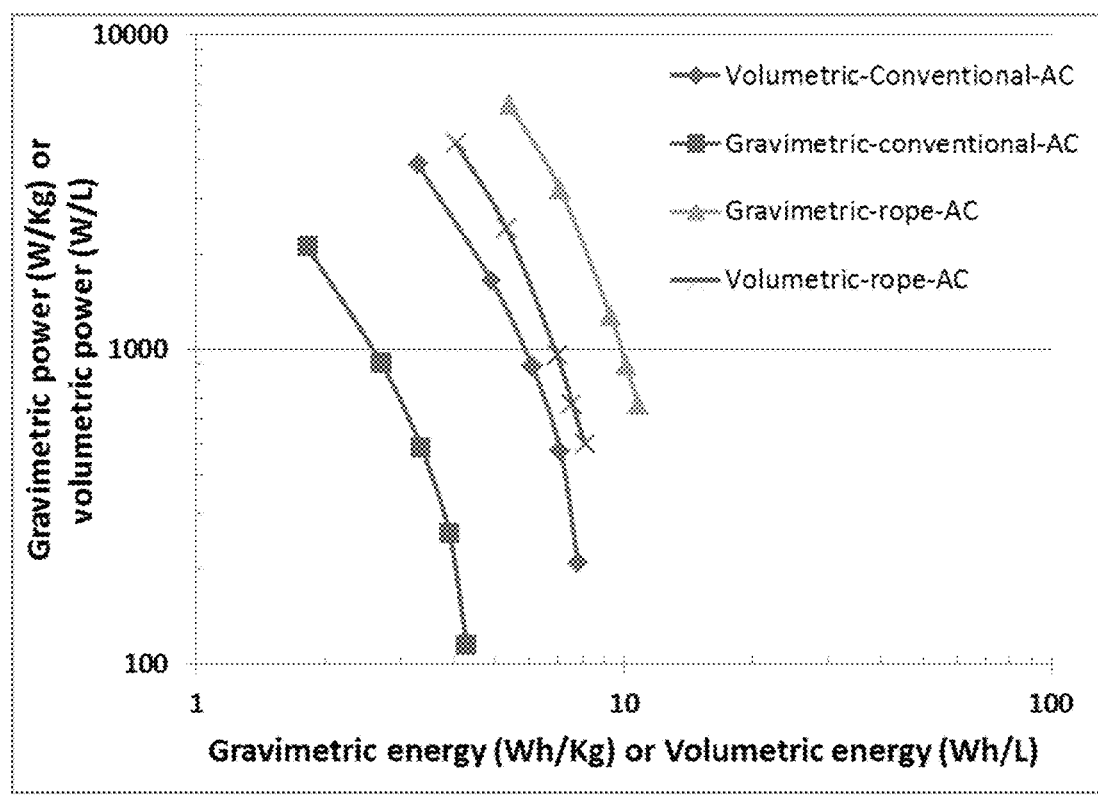
FIG. 6 Ragone plots (gravimetric and volumetric power density vs. energy density) of symmetric supercapacitor (EDLC) cells containing activated carbon (AC) particles as the electrode active material and organic liquid electrolyte.

FIG. 6 shows the Ragone plots (both gravimetric and volumetric power density vs. energy density) of symmetric supercapacitor (EDLC) cells containing activated carbon (AC) particles as the electrode active material and organic liquid electrolyte. The experimental data were obtained from the supercapacitors that were prepared by the presently invented method (rope-shape cells) and those by the conventional slurry coating of electrodes.

These data also indicate that both the gravimetric and volumetric energy densities and power densities of the supercapacitor cells prepared by the presently invented method are significantly higher than those of their counterparts prepared via the conventional method. Again, the differences are huge and are mainly due to the high active material mass loading (>15 mg/cm²) associated with the presently invented rope-shape cells, reduced proportion of overhead (non-active) components relative to the active material weight/volume, no need to have a binder resin, the ability of the inventive method to more effectively pack graphene sheets into pores of the foamed current collectors. The highly porous activated carbon particles are not as amenable to more compact packing as graphene sheets. Consequently, for AC-based supercapacitors, the absolute magnitudes of the volumetric energy densities and volumetric power densities are lower than those of corresponding gravimetric energy densities and gravimetric power densities. However, the presently invented methods still surprisingly enables the AC particles to be packed with a significantly higher tap density (0.75 g/cm³) than what is achieved with the conventional slurry coating process (0.55 g/cm³) in the present study.

Figure 7A:
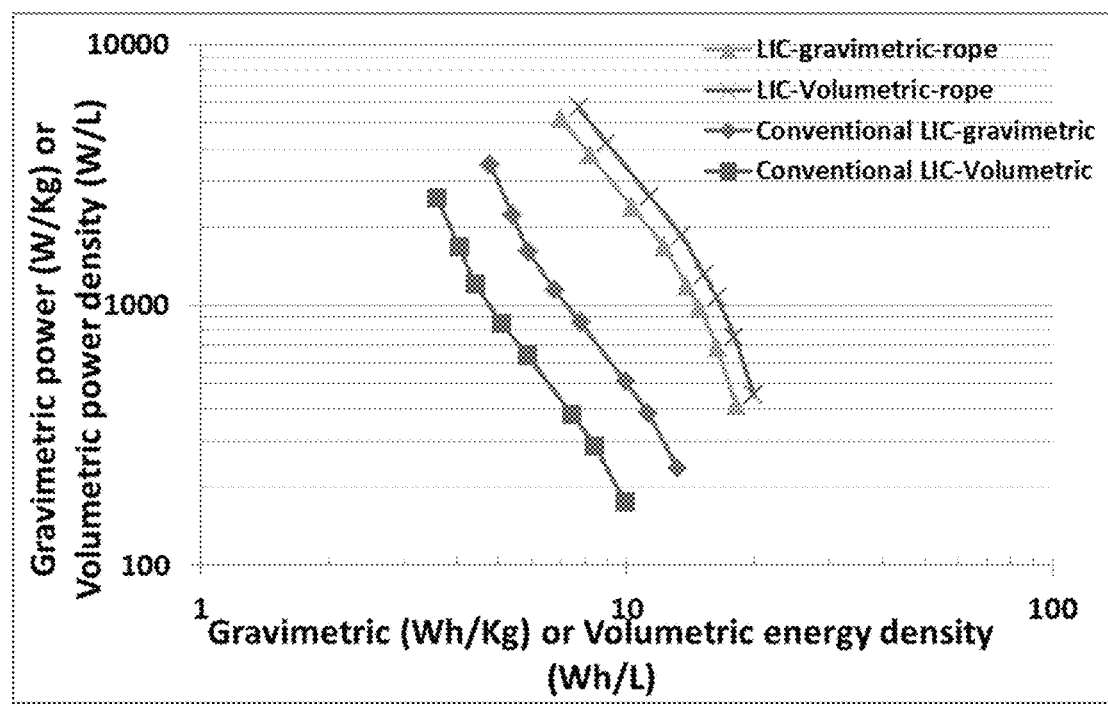
FIG. 7(A) Ragone plots (gravimetric and volumetric power density vs. energy density) of lithium ion capacitor (LIC) cells containing pristine graphene sheets as the electrode active material and lithium salt-PC/DEC organic liquid electrolyte.

Shown in FIG. 7(A) are Ragone plots of lithium ion capacitor (LIC) cells containing pristine graphene sheets as the cathode active material, prelithiated graphite particles as the anode active material, and lithium salt (LiPF₆)-PC/DEC as organic liquid electrolyte. The data are for both LICs prepared by the presently invented method and those by the conventional slurry coating of electrodes. These data indicate that both the gravimetric and volumetric energy densities and power densities of the LIC cells prepared by the presently invented method are significantly higher than those of their counterparts prepared via the conventional method. Again, the differences are huge and are mainly ascribed to the high active material mass loading (>15 mg/cm² at the anode side and >25 mg/cm² at the cathode side) associated with the presently invented rope-shape cells, reduced proportion of overhead (non-active) components relative to the active material weight/volume, lack of a binder resin, the ability of the inventive method to more effectively pack graphene sheets into pores of the foamed current collectors.

For the LIC cells prepared by the conventional method, the absolute magnitudes of the volumetric energy densities and volumetric power densities are significantly lower than those of their gravimetric energy densities and gravimetric power densities, due to the very low tap density (average packing density of 0.75 g/cm³) of pristine graphene-based cathodes prepared by the conventional slurry coating method. In contrast, for the rope-shape LIC cells prepared by the instant method, the absolute magnitudes of the volumetric energy densities and volumetric power densities are higher than those of their gravimetric energy densities and gravimetric power densities, due to the relatively high tap density of pristine graphene-based cathodes prepared by the presently invented method.

Figure 7B:
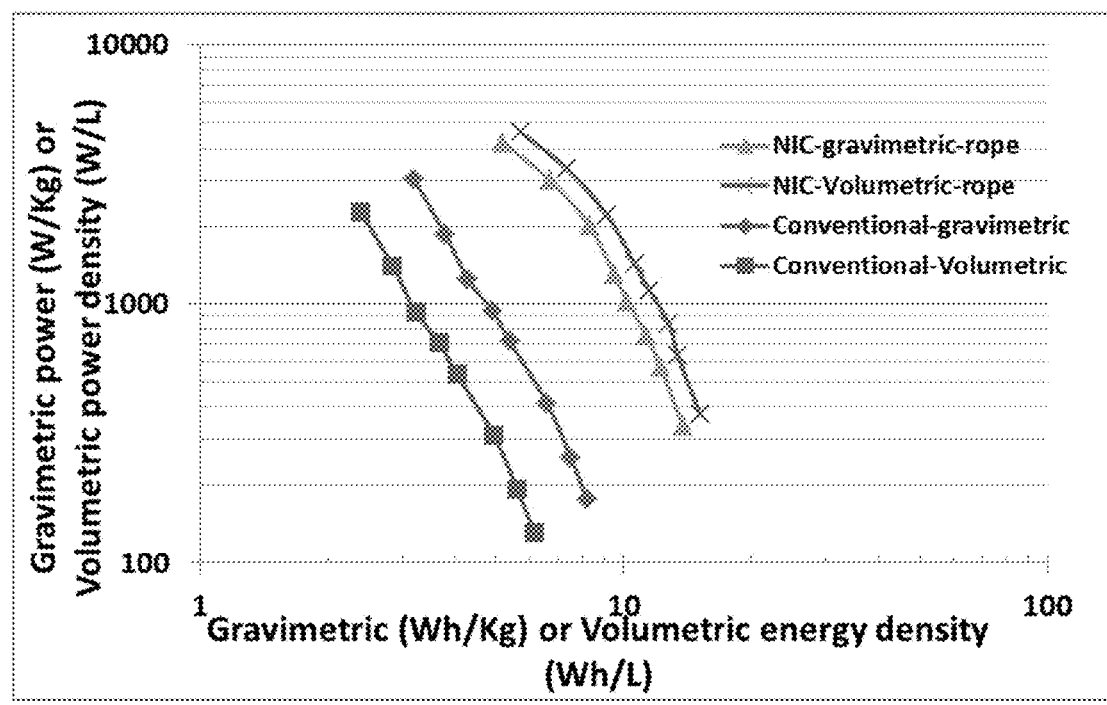
FIG. 7(B) Ragone plots (gravimetric and volumetric power density vs. energy density) of sodium ion capacitor (NIC) cells containing pristine graphene sheets as the electrode active material and sodium salt-PC/DEC organic liquid electrolyte.

Shown in FIG. 7(B) are Ragone plots of sodium-ion capacitor (NIC) cells containing pristine graphene sheets as the cathode active material, pre-sodiated graphite particles as the anode active material, and sodium salt (NaPF₆)-PC/DEC as organic liquid electrolyte. The data are for both LICs prepared by the presently invented method and those by the conventional slurry coating of electrodes. These data indicate that both the gravimetric and volumetric energy densities and power densities of the NIC cells prepared by the presently invented method (rope-shape cells) are significantly higher than those of their counterparts prepared via the conventional method. Again, the differences are dramatic and are mainly due to the high active material mass loading (>15 mg/cm² at the anode side and >25 mg/cm² at the cathode side) associated with the presently invented cells, reduced proportion of overhead (non-active) components relative to the active material weight/volume, no need to have a binder resin, the ability of the inventive method to more effectively pack graphene sheets into pores of the foamed current collectors.

It is of significance to point out that reporting the energy and power densities per weight of active material alone on a Ragone plot, as did by many researchers, may not give a realistic picture of the performance of the assembled supercapacitor cell. The weights of other device components also must be taken into account. These overhead components, including current collectors, electrolyte, separator, binder, connectors, and packaging, are non-active materials and do not contribute to the charge storage amounts. They only add weights and volumes to the device. Hence, it is desirable to reduce the relative proportion of overhead component weights and increase the active material proportion. However, it has not been possible to achieve this objective using conventional supercapacitor production processes. The present invention overcomes this long-standing, most serious problem in the art of supercapacitors.

In a commercial supercapacitor having an electrode thickness of 150-200 μm (75-100 μm on each side of an Al foil current collector), the weight of the active material (i.e. activated carbon) accounts for about 25%-30% of the total mass of the packaged cell. Hence, a factor of 3 to 4 is frequently used to extrapolate the energy or power densities of the device (cell) from the properties based on the active material weight alone. In most of the scientific papers, the properties reported are typically based on the active material weight alone and the electrodes are typically very thin (<<100 μm, and mostly <<50 μm). The active material weight is typically from 5% to 10% of the total device weight, which implies that the actual cell (device) energy or power densities may be obtained by dividing the corresponding active material weight-based values by a factor of 10 to 20. After this factor is taken into account, the properties reported in these papers do not really look any better than those of commercial supercapacitors. Thus, one must be very careful when it comes to read and interpret the performance data of supercapacitors reported in the scientific papers and patent applications.

EXAMPLE 13

Achievable Electrode Thickness and its Effect On Electrochemical Performance of Supercapacitor Cells One might be tempted to think the electrode thickness of a supercapacitor is a design parameter that can be freely adjusted for optimization of device performance; but, in reality, the supercapacitor thickness is manufacturing-limited and one cannot produce electrodes of good structural integrity that exceed certain thickness level. Our studies further indicate that this problem is even more severe with graphene-based electrode. The instant invention solves this critically important issue associated with supercapacitors.

Figure 8:
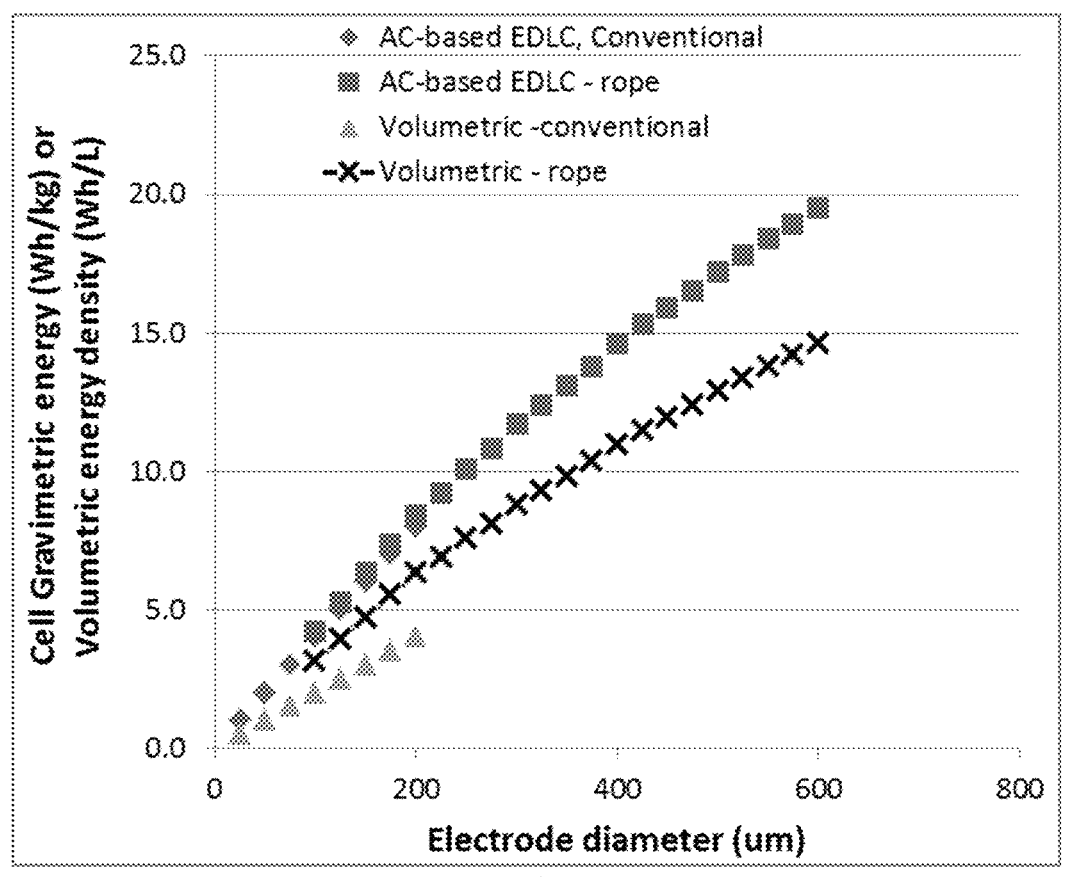
FIG. 8 The cell-level gravimetric and volumetric energy densities plotted over the achievable electrode diameter range of the AC-based EDLC supercapacitors prepared via the conventional method and the presently invented method. With the presently invented method, there is no theoretical limit on the electrode diameter that can be achieved. Typically, the practical electrode thickness is from 10 μm to 5,000 μm, more typically from 100 μm to 1,000 μm, and most typically from 200 μm to 800 μm.

Shown in FIG. 8 are the cell-level gravimetric (Wh/kg) and volumetric energy densities (Wh/L) plotted over the achievable electrode thickness range of the activated carbon-based symmetric EDLC supercapacitors prepared via the conventional method and those rope-shape cells prepared by the presently invented method. The activated carbon-based electrodes can be fabricated up to a thickness of 100-200 μm using the conventional slurry coating process. However, in contrast, there is no theoretical limit on the electrode thickness that can be achieved with the presently invented method. Typically, the practical electrode thickness is from 10 μm to 5000 μm, more typically from 50 μm to 2,000 μm, further more typically from 100 μm to 1,000 μm, and most typically from 200 μm to 800 μm.

These data further confirm the surprising effectiveness of the presently invented method in producing ultra-thick supercapacitor electrodes not previously achievable. These ultra-thick electrodes lead to exceptionally high active material mass loading, typically significantly >10 mg/cm$^2$ (more typically >15 mg/cm$^2$, further typically >20 mg/cm$^2$, often >25 mg/cm$^2$, and even >30 mg/cm$^2$). These high active material mass loadings have not been possible to obtain with conventional supercapacitors made by the slurry coating processes.

Further significantly, the typical cell-level energy densities of commercial AC-based supercapacitors are from 3 to 8 Wh/kg and from 1 to 4 Wh/L. In contrast, the presently invented method enables supercapacitors containing the same type of electrode active material (AC) to deliver an energy density up to 19.5 Wh/kg or 14.6 Wh/L. Such an increase in energy density has not been considered possible in the supercapacitor industry.

Figure 9:
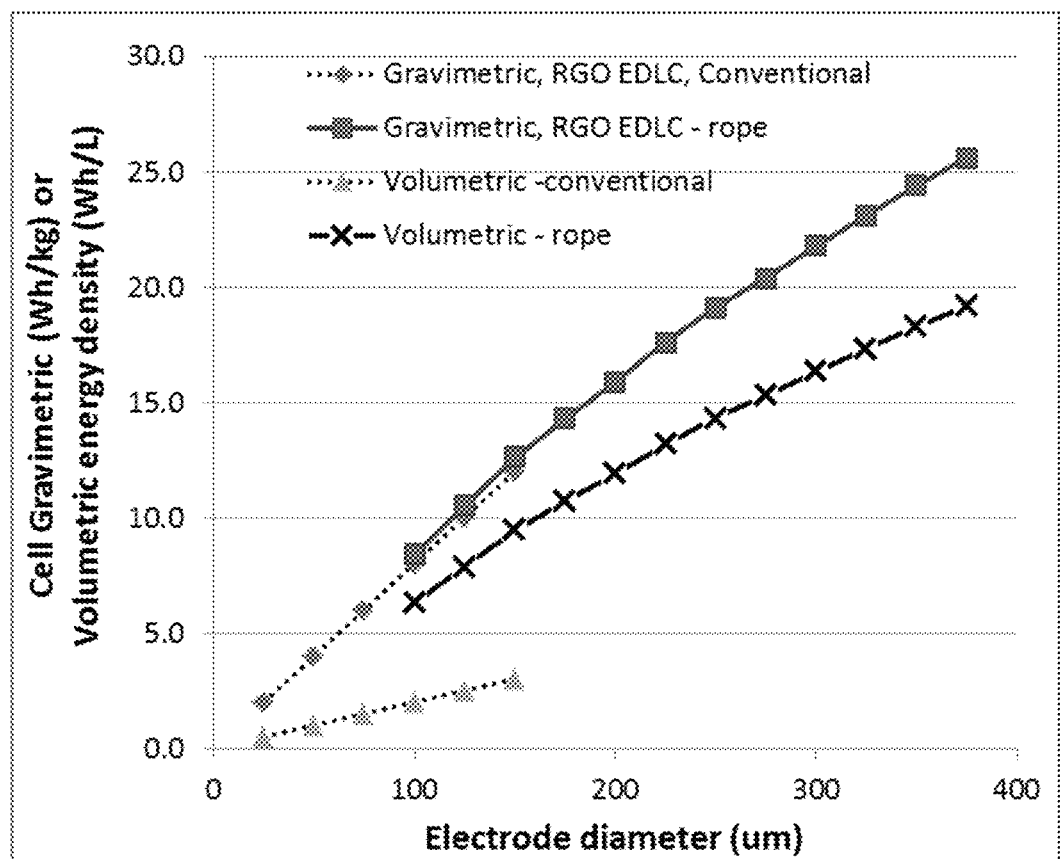
FIG. 9 The cell-level gravimetric and volumetric energy densities plotted over the achievable electrode thickness range of the RGO-based EDLC supercapacitors (organic liquid electrolyte) prepared via the conventional method and the rope-shape cells prepared by the presently invented method (easily achieved electrode tap density of approximately 0.75 $g/cm^3$).

Also highly significant and unexpected are the data summarized in FIG. 9 for reduced graphene oxide-based EDLC supercapacitors. The cell-level gravimetric and volumetric energy densities plotted over the achievable electrode thickness range of the RGO-based EDLC supercapacitors (organic liquid electrolyte) prepared via the conventional method and those by the presently invented method. In this figure, the gravimetric (♦) and volumetric (▲) energy density of the conventional supercapacitors are based on the highest achieved electrode tap density of approximately 0.25 g/cm$^3$, and the gravimetric (■) and volumetric (x) energy density of the presently invented rope-shape supercapacitors are from those having an electrode tap density of approximately 0.75 g/cm$^3$, by no means the highest. No one else has previously reported such a high tap density for un-treated, non-activated RGO electrodes.

These data indicate that the highest gravimetric energy density achieved with RGO-based EDLC supercapacitor cells produced by the conventional slurry coating method is approximately 12 Wh/kg, but those prepared by the presently invented method exhibit a gravimetric energy density as high as 25.6 Wh/kg at room temperature. This is an unprecedentedly high energy density value for EDLC supercapacitors (based on the total cell weight, not the electrode weight or active material weight alone). Even more impressive is the observation that the volumetric energy density of the presently invented supercapacitor cell is as high as 19.2 Wh/L, which is more than 6 times greater than the 3.0 Wh/L achieved by the conventional counterparts.

Figure 10:
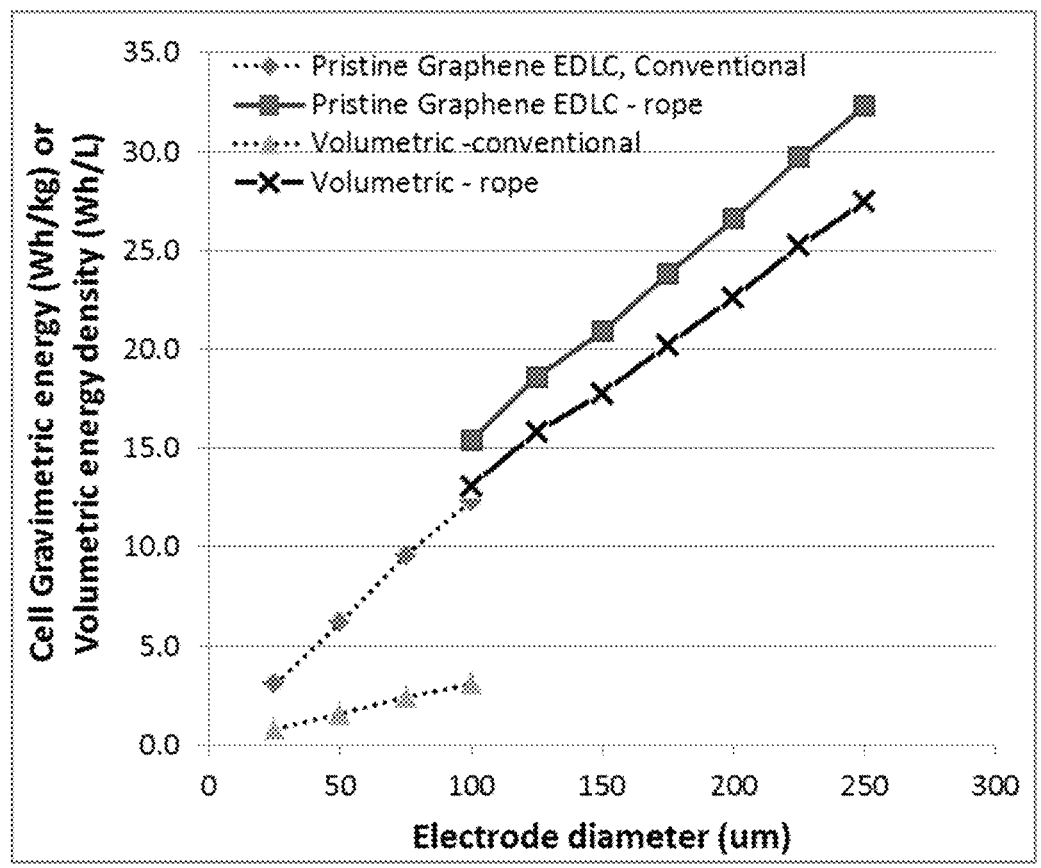
FIG. 10 The cell-level gravimetric and volumetric energy densities plotted over the achievable electrode thickness range of the pristine graphene-based EDLC supercapacitors (organic liquid electrolyte) prepared via the conventional method and those rope-shape cells by the presently invented method (electrode tap density of approximately 0.85 $g/cm^3$).

Summarized in FIG. 10 are the data of the cell-level gravimetric and volumetric energy densities plotted over the achievable electrode thickness range of the pristine graphene-based EDLC supercapacitors (organic liquid electrolyte) prepared via the conventional method and those rope-shape cells prepared by the presently invented method. The legends include the gravimetric (♦) and volumetric (▲) energy density of the conventional supercapacitors (highest achieved electrode tap density of approximately 0.25 g/cm$^3$) and the gravimetric (ζ) and volumetric (X) energy density of the presently invented supercapacitors (electrode tap density of approximately 0.85 g/cm$^3$).

Quite significantly, these EDLC supercapacitors (without any redox or pseudo-capacitance) deliver a gravimetric energy density as high as 32.3 Wh/kg, which are already in the energy densities (20-40 Wh/kg) of advanced lead-acid batteries. This is of high utility value since an EDLC supercapacitor can be charged and discharged for 250,000-500,000 cycles, as opposed to the typical 100-400 cycles of lead-acid batteries. This achievement is very dramatic and totally unexpected in the art of supercapacitors. In addition, carbon- or graphene-based EDLC supercapacitors can be re-charged in seconds, in contrast to the typically hours of recharge time required of lead-acid batteries. Lead-acid batteries are notorious for their highly negative environmental impact, yet the instant supercapacitors are environmentally benign.

Figure 11:
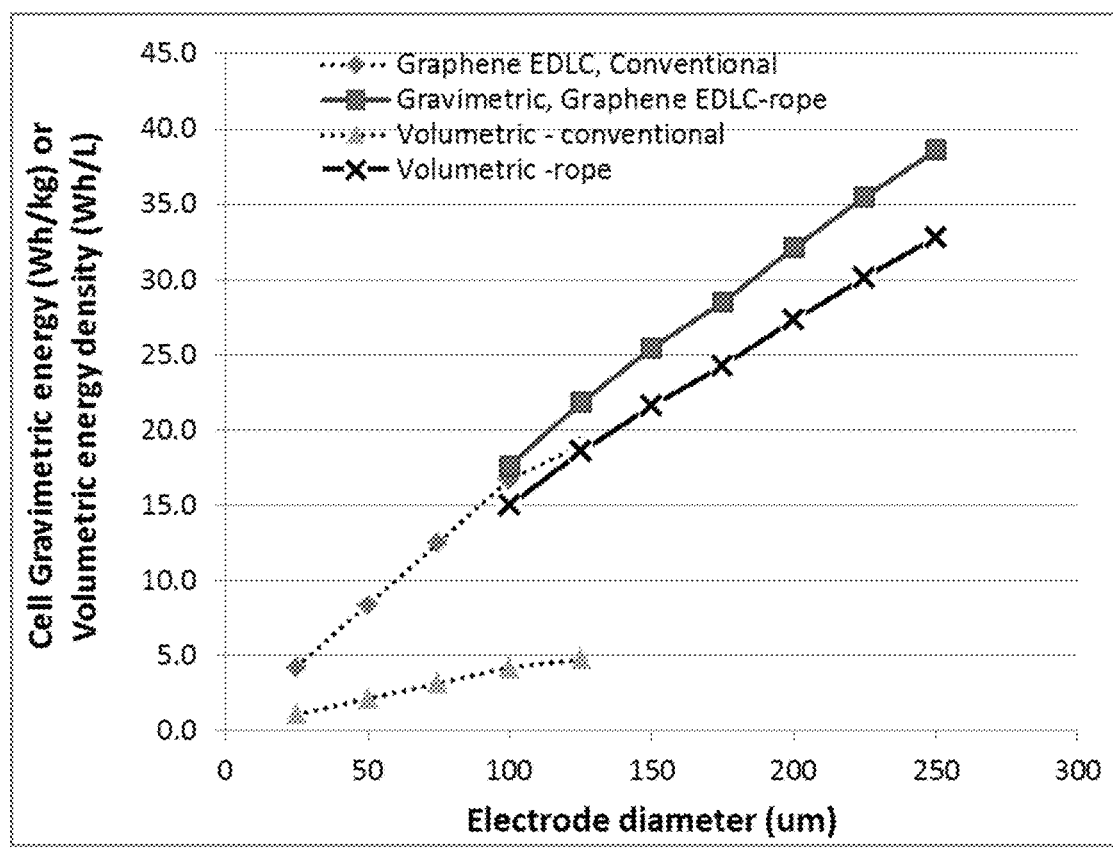
FIG. 11 The cell-level gravimetric and volumetric energy densities plotted over the achievable electrode thickness range of the pristine graphene-based EDLC supercapacitors (ionic liquid electrolyte) prepared via the conventional method and those rope-shape cells by the presently invented method (electrode tap density of approximately 0.85 $g/cm^3$).

Further significant examples include those data summarized in FIG. 11 for the cell-level gravimetric and volumetric energy densities plotted over the achievable electrode thickness range of the pristine graphene-based EDLC supercapacitors (ionic liquid electrolyte) prepared via the conventional method and those rope-shape cells fabricated by the presently invented method. The gravimetric (▲) and volumetric (♦) energy density are for those conventional supercapacitors (highest achieved electrode tap density of approximately 0.25 g/cm$^3$) and the gravimetric (■) and volumetric (X) energy density are for those inventive supercapacitors having an electrode tap density of approximately 0.85 g/cm$^3$. The presently invented pristine graphene-based EDLC supercapacitors are capable of storing a cell-level energy density of 38.6 Wh/kg, which is 6 times greater than what could be achieved by conventional AC-based EDLC supercapacitors. The volumetric energy density value of 32.8 Wh/L is also unprecedented and is 10-fold greater than the 3-4 Wh/L of commercial AC-based supercapacitors.

EXAMPLE 14

Achievable Active Material Weight Percentage in a Cell and its Effect on Electrochemical Performance of Supercapacitor Cells Because the active material weight accounts for up to about 30% of the total mass of the packaged commercial supercapacitors, a factor of 30% must be used to extrapolate the energy or power densities of the device from the performance data of the active material alone. Thus, the energy density of 20 Wh/kg of activated carbon (i.e. based on the active material weight alone) will translate to about 6 Wh/kg of the packaged cell. However, this extrapolation is only valid for electrodes with thicknesses and densities similar to those of commercial electrodes (150 µm or about 10 mg/cm$^2$ of the carbon electrode). An electrode of the same active material that is thinner or lighter will mean an even lower energy or power density based on the cell weight. Thus, it would be desirable to produce a supercapacitor cell having a high active material proportion. Unfortunately, it has not been previously possible to achieve an active material proportion greater than 30% by weight for activated carbon-based supercapacitors or greater than 15% by weight for graphene-based supercapacitors.

The presently invented method enables the supercapacitors to go well beyond these limits for all active materials investigated. As a matter of fact, the instant invention makes it possible to elevate the active material proportion above 90% if so desired; but typically from 15% to 85%, more typically from 30% to 80%, even more typically from 40% to 75%, and most typically from 50% to 70%.

Figure 12:
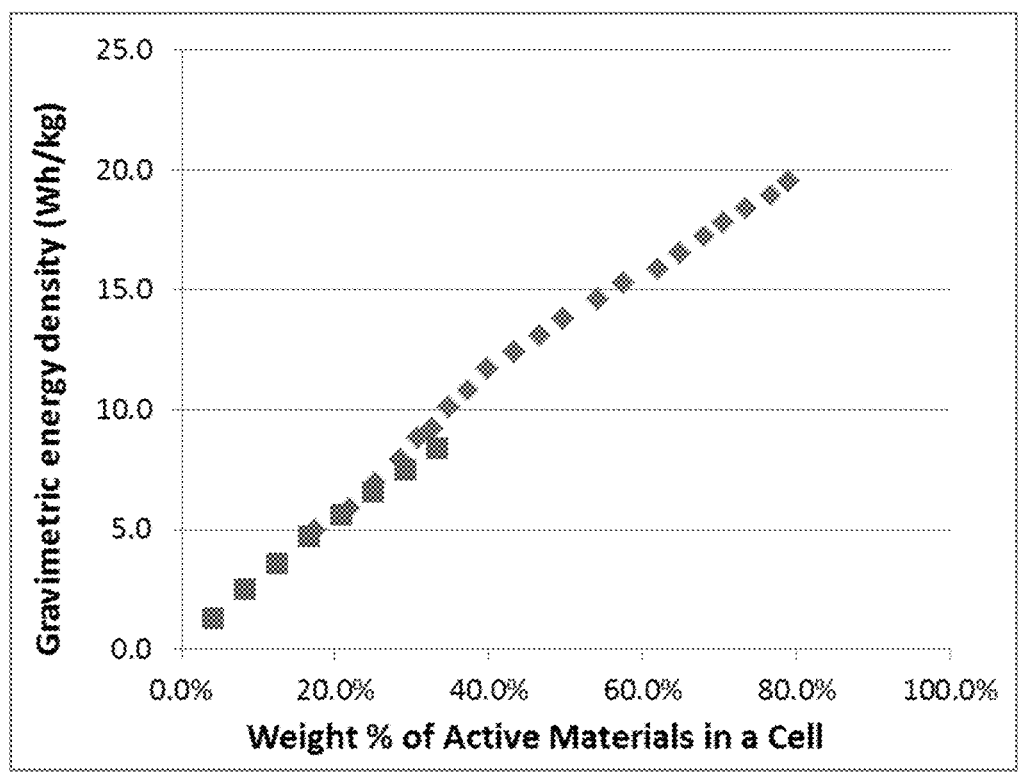
FIG. 12 The cell-level gravimetric energy densities plotted over the achievable active material proportion (active material weight/total cell weight) for activated carbon-based EDLC supercapacitors (with organic liquid electrolyte).
Figure 13:
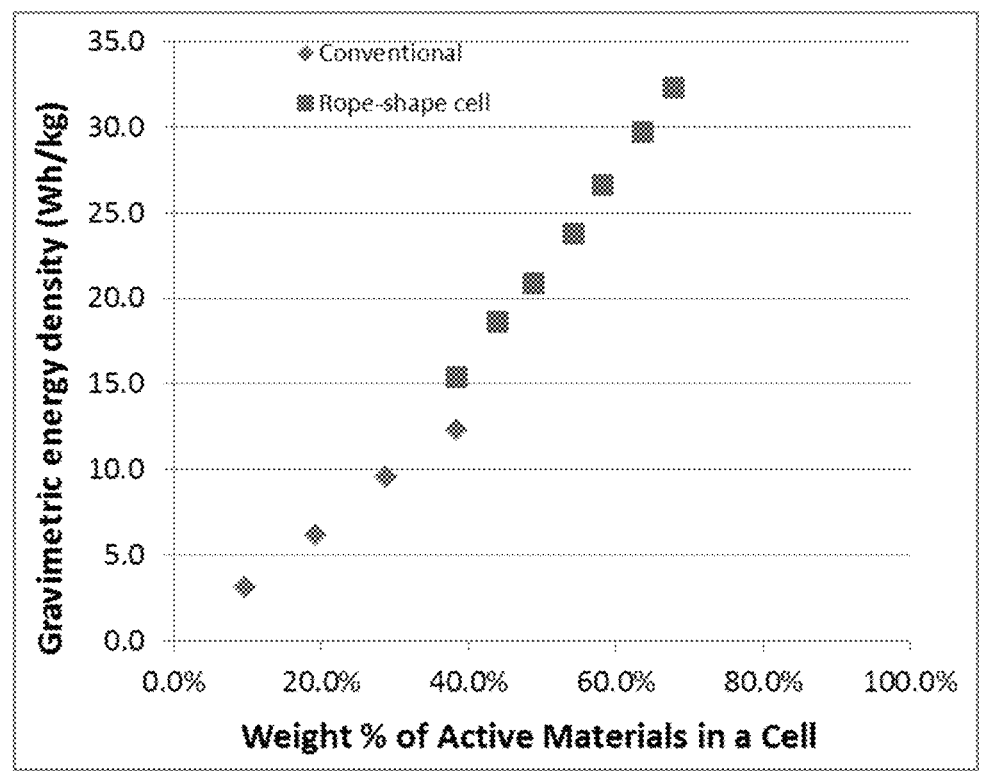
FIG. 13 The cell-level gravimetric energy densities plotted over the achievable active material proportion (active material weight/total cell weight) in a supercapacitor cell for two series of pristine graphene-based EDLC supercapacitors (all with organic liquid electrolyte).

As shown in FIG. 12, the cell-level gravimetric energy densities of the activated carbon-based EDLC supercapacitors (with organic liquid electrolyte) are plotted over the achievable active material proportion (active material weight/total cell weight), which are from 4.2% to 33.3% resulting in an energy density from 1.3 to 8.4 Wh/kg. The instant invention allows us to achieve a pristine graphene content in a supercapacitor cell from 17.5% to 79% by weight, resulting in a gravimetric energy density from 4.9 to 19.5 Wh/kg. For instance, FIG. 13 shows the cell-level gravimetric energy densities plotted over the achievable active material proportion (active material weight/total cell weight) in a supercapacitor cell for two series of pristine graphene-based EDLC supercapacitors (all with organic liquid electrolyte). Again, the presently invented rope-shape cells containing filamentary electrodes pre-impregnated with an active material-electrolyte mixture can be made to contain an exceptionally high active material proportion and, hence, extraordinarily high energy density.

EXAMPLE 15

The electrochemical performance of supercapacitor cells based on various electrode active materials and/or different porous or foamed structures as current collectors In order to evaluate the effect of the foam structure, we chose to use RGO as an example of electrode active material but vary the type and nature of the current collector (porous rods or filaments). A wide variety of foams were selected, ranging from metal foam (e.g. Ni and Ti foam), metal web (e.g. stainless steel web), perforated metal sheet-based 3-D structure, metal fiber mat (steel fibers), metal nanowire mat (Cu nanowires), conductive polymer nano-fiber mat (polyaniline), conductive polymer foam (e.g. PEDOT), conductive polymer-coated fiber foam (polypyrroe-coated nylon fibers), carbon foam, graphite foam, carbon aerogel, carbon xerox gel, graphene foam (from Ni-supported CVD graphene), graphene oxide foam (obtained via freeze-drying GO-water solution), reduced graphene oxide foam (RGO mixed with a polymer and then carbonized), carbon fiber foam, graphite fiber foam, and exfoliated graphite foam (exfoliated graphite worms bonded by a carbonized resin). This extensive and in-depth study leads to the following important observations:

(A) The electrical conductivity of the foam material is an important parameter with a higher conductivity tending to result in a higher power density and faster supercapacitor response time.

(B) The porosity level is also an important parameter with a higher pore content resulting in a larger amount of active material given the same volume, leading to a higher energy density. However, a higher porosity level can lead to slower response time possibly due to a lower electron-conducting capability.

(C) Graphite foams and graphene foams provide better response time of a supercapacitor. However, metal foam enables more ready formation of or connection to a tab (terminal lead). Two leads are required in each cell.

A wide variety of electrode active materials for both EDLC and redox supercapacitors have been investigated, covering organic and inorganic materials, in combination with aqueous, organic, and ionic liquid electrolytes. Summarized in the following table (Table 1) are some examples of different classes of supercapacitors for illustration purposes. These should not to be construed as limiting the scope of the instant application.

TABLE 1

Examples of supercapacitors prepared by the new method and their counterparts prepared by the conventional slurry coating method.

| Sample ID | Active materials | Electrolyte | Electrode diameter (µm) and method | Active mass loading (g/cm$^2$) | Gravimetric energy density (Wh/kg) | Volumetric energy density (Wh/L) |
|---|---|---|---|---|---|---|
| PPy-1 | Polypyrrole-cellulose | 4.5M NaCl in H$_2$O | 503, rope | 38 | 41 | 22 |
| PPy-c | Polypyrrole-cellulose | 4.5M NaCl in H$_2$O | 185, conventional | 12.8 | 8.6 | 3.2 |
| RuO$_2$-AC-1 | RuO$_2$ + AC | 3.5M NaCl in H$_2$O | 348, rope | 15 | 35.6 | 24.7 |
| RuO$_2$-AC-c | RuO$_2$ + AC | 3.5M NaCl in H$_2$O | 160, conventional | 7.2 | 11.6 | 7.7 |
| NiO-RGO-1 | NiO + activated GO | 5.5M LiOH in H$_2$O | 551, rope | 26.2 | 40.5 | 33.2 |
| NiO-RGO-c | NiO + Activated GO | 5.5M LiOH in H$_2$O | 160, conventional | 4.6 | 9.2 | 7.3 |

TABLE 1-continued

Examples of supercapacitors prepared by the new method and their counterparts prepared by the conventional slurry coating method.

| Sample ID | Active materials | Electrolyte | Electrode diameter (μm) and method | Active mass loading (g/cm$^2$) | Gravimetric energy density (Wh/kg) | Volumetric energy density (Wh/L) |
|---|---|---|---|---|---|---|
| V$_2$O$_5$-NGn-1 | V$_2$O$_5$ + nitrogenated graphene | THF + N(Et)$_4$BF$_4$ | 624, rope | 27.1 | 41.1 | 35.2 |
| V$_2$O$_5$-NGn-c | V$_2$O$_5$ + nitrogenated graphene | THF + N(Et)$_4$BF$_4$ | 175, conventional | 5.6 | 7.2 | 5.6 |
| MnO$_2$-RGO-1 | MnO$_2$ + RGO | 3.5M Na$_2$SO$_4$ | 405, rope | 16.6 | 74 | 81 |
| MnO$_2$-RGO-c | MnO$_2$ + RGO | 3.5M Na$_2$SO$_4$ | 187, conventional | 6.2 | 29 | 23 |
| MoS$_2$-1 | MoS$_2$/RGO | Acetonitrile + N(Et)$_4$BF$_4$ | 355, rope | 24.7 | 38.4 | 33.2 |
| MoS$_2$-c | MoS$_2$/RGO | Acetonitrile + N(Et)$_4$BF$_4$ | 155, conventional | 8.8 | 13.2 | 9.6 |
| Ti$_2$CT$_x$-1 | Ti$_2$C(OH)$_2$/ quinone GO | 3M LiOH in H$_2$O | 331, rope | 13.8 | 13.4 | 11.2 |
| Ti$_2$CT$_x$-c | Ti$_2$C(OH)$_2$/ quinone GO | 3M LiOH in H$_2$O | 167, conventional | 4.5 | 6.7 | 4.2 |
| CNT-1 | Chopped MWCNT | EMI-TFSI | 275, rope | 12.3 | 24.3 | 15.2 |
| CNT-c | Chopped MWCNT | EMI-TFSI | 95 | 2.3 | 6.2 | 3.2 |

These data further confirm the surprising superiority of the presently invented rope-shape supercapacitor cells and the production method in terms of dramatically improving mass loading (proportion), electrode diameter/thickness, gravimetric energy density, and volumetric energy density. The presently invented rope-shape supercapacitors having active material/electrolyte-pre-impregnated braid/yarn electrodes are consistently much better than the conventional supercapacitors in electrochemical properties. The differences are surprisingly dramatic.

In conclusion, we have successfully developed a new and novel class of supercapacitors that are flexible and shape-conformable and have unexpectedly large active material mass loading (not previously achievable), outstanding gravimetric energy density (not previously achievable), and unprecedentedly high volumetric energy density. The invented method of pre-impregnation of an active material-electrolyte mixture into foamed current collectors to make electrodes also overcomes the long-standing problems associated with graphene sheet-based supercapacitors (i.e. inability to make thick electrodes, difficulty in preventing graphene sheet re-stacking, low tap density, and low volumetric energy density).

We claim:

1. A process for producing a rope-shaped supercapacitor, said process comprising:
   (a) impregnating a first mixture of a first electrode active material and a first electrolyte into pores of a first electrically conductive porous rod to form a first electrode;
   (b) wrapping or encasing a porous separator around said first electrode to form a separator-protected first electrode;
   (c) impregnating a second mixture of a second electrode active material and a second electrolyte into pores of a second electrically conductive porous rod to form a second electrode;
   (d) combining or interlacing said separator-protected first electrode and said second electrode together to form a braid or a twist yarn; and
   (e) wrapping or encasing a protective casing or sheath around said braid or twist yarn to form said rope-shaped supercapacitor;

wherein said first and/or said second electrode active material contains multiple particles of a carbon material and/or multiple graphene sheets, wherein said multiple graphene sheets contain single-layer graphene or few-layer graphene each having from 1 to 10 graphene planes and said multiple particles of carbon material or graphene sheets have a specific surface area no less than 500 m$^2$/g when measured in a dried state.

2. The process of claim 1, comprising a procedure of combining a plurality of said first electrodes and/or a plurality of said second electrodes to form said supercapacitor, wherein at least one of said electrodes is an anode and at least one is a cathode.

3. The process of claim 1, further comprising a step of wrapping or encasing a porous separator around said second electrode to form a separator-protected second electrode.

4. The process of claim 3, further comprising a step of disposing a third electrolyte between said braid or yarn and said protective sheath.

5. The process of claim 1, wherein the first or the second electrode active material contains particles of activated carbon or isolated graphene sheets having a length or width smaller than 1 μm to impregnate into the pores of the first or the second electrode, wherein said graphene sheets are selected from pristine graphene, graphene oxide, reduced graphene oxide, fluorinated graphene, nitrogenated or nitrogen-doped graphene, hydrogeneated or hydrogen-doped graphene, boron-doped graphene, chemically functionalized graphene, or a combination thereof.

6. A process for producing a rope-shaped supercapacitor having a length-to-diameter or length-to-thickness aspect ratio greater than 10; said process comprising:

(a) providing a first electrode comprising a first electrically conductive rod and a first mixture of a first electrode active material and a first electrolyte, wherein said first mixture is deposited on or in said first rod;

(b) wrapping or encasing a porous separator around said first electrode to form a separator-protected first electrode;

(c) impregnating a second mixture of a second electrode active material and a second electrolyte into pores of a second electrically conductive porous rod to form a second electrode;

(d) combining or interlacing said separator-protected first electrode and said second electrode in a twist or spiral manner to form a braid or yarn; and (e) wrapping or encasing a protective casing or sheath around said braid or yarn to form said supercapacitor;

wherein said first active material and/or said second active material contains multiple particles of a carbon material and/or multiple graphene sheets, wherein said multiple graphene sheets contain single-layer graphene or few-layer graphene each having from 1 to 10 graphene planes and said multiple particles of carbon material or graphene sheets have a specific surface area no less than 500 $m^2/g$ when measured in a dried state.

7. The process of claim 6, further comprising a step of wrapping or encasing a porous separator around said second electrode to form a separator-protected second electrode.

8. The process of claim 1, wherein said rope-shaped battery has a first end and a second end and said process further contains a step of connecting a first terminal connector to said first electrode, wherein said first terminal connector comprises at least one metallic wire, conductive carbon/graphite fiber, or conductive polymer fiber that is embedded in, connected to, or integral with said first electrode.

9. The process of claim 8, wherein said at least one metallic wire, conductive carbon/graphite fiber, or conductive polymer fiber runs approximately from said first end to said second end.

10. The process of claim 1, wherein said first or second electrically conductive porous rod contains a porous foam selected from a metal foam, metal web, metal fiber mat, metal nanowire mat, conductive polymer fiber mat, conductive polymer foam, conductive polymer-coated fiber foam, carbon foam, graphite foam, carbon aerogel, carbon xerogel, graphene aerogel, graphene foam, graphene oxide foam, reduced graphene oxide foam, carbon fiber foam, graphite fiber foam, exfoliated graphite foam and combinations thereof.

11. The process of claim 1, wherein said supercapacitor has a rope shape having a length/thickness or length/diameter aspect ratio greater than 10.

12. The process of claim 5, wherein said first or second electrode further contains a redox pair partner material selected from a metal oxide, a conducting polymer, an organic material, a non-graphene carbon material, an inorganic material, or a combination thereof, wherein said partner material, in combination with graphene or activated carbon, forms a redox pair for pseudo-capacitance.

13. The process of claim 12, wherein said metal oxide is selected from $RuO_2$, $IrO_2$, NiO, $MnO_2$, $VO_2$, $V_2O_5$, $V_3O_8$, $TiO_2$, $Cr_2O_3$, $Co_2O_3$, $Co_3O_4$, $PbO_2$, $Ag_2O$ and combinations thereof.

14. The process of claim 12, wherein said inorganic material is selected from a metal carbide, metal nitride, metal boride, metal dichalcogenide and combinations thereof.

15. The process of claim 12, wherein said metal oxide or inorganic material is selected from an oxide, dichalcogenide, trichalcogenide, sulfide, selenide, or telluride of niobium, zirconium, molybdenum, hafnium, tantalum, tungsten, titanium, vanadium, chromium, cobalt, manganese, iron, or nickel in a nanowire, nano-disc, nano-ribbon, or nano platelet form.

16. The process of claim 12, wherein said inorganic material is selected from nano discs, nano platelets, nano-coating, or nano sheets of an inorganic material selected from the group comprising bismuth selenide, bismuth telluride, transition metal dichalcogenide, transition metal trichalcogenide, sulfide of niobium, zirconium, molybdenum, hafnium, tantalum, tungsten, titanium, cobalt, manganese, iron, nickel or a transition metal, selenide of niobium, zirconium, molybdenum, hafnium, tantalum, tungsten, titanium, cobalt, manganese, iron, nickel or a transition metal, telluride of niobium, zirconium, molybdenum, hafnium, tantalum, tungsten, titanium, cobalt, manganese, iron, nickel or a transition metal, boron nitride, and combinations thereof; wherein said discs, platelets, or sheets have a thickness less than 100 nm.

17. The process of claim 1, wherein said first or second electrode active material contains nano discs, nano platelets, nano-coating, or nano sheets of an inorganic material selected fromselected from the group comprising bismuth selenide, bismuth telluride, transition metal dichalcogenide, transition metal trichalcogenide, sulfide of niobium, zirconium, molybdenum, hafnium, tantalum, tungsten, titanium, cobalt, manganese, iron, nickel or a transition metal, selenide of niobium, zirconium, molybdenum, hafnium, tantalum, tungsten, titanium, cobalt, manganese, iron, nickel or a transition metal, telluride of niobium, zirconium, molybdenum, hafnium, tantalum, tungsten, titanium, cobalt, manganese, iron, nickel or a transition metal, boron nitride, and combinations thereof, wherein said discs, platelets, coating, or sheets have a thickness less than 100 nm and a specific surface area no less than 200 $m^2/g$ when measured in a dried state.

18. The process of claim 1, wherein said first or second electrically conductive porous rod has from 70% to 99% by volume of pores.

19. The process of claim 1, wherein said step (a) includes (i) an operation of continuously feeding said electrically conductive porous rod to a first electrode active material impregnation zone, wherein said electrically conductive porous rod contains interconnected electron-conducting pathways and has at least one porous surface; and (ii) an operation of impregnating said first mixture into said electrically conductive porous rod from said at least one porous surface to form said first electrode.

20. The process of claim 19, wherein said step (a) includes delivering, continuously or intermittently on demand, said first mixture to said at least one porous surface through spraying, printing, coating, casting, conveyor film delivery, and/or roller surface delivery.

21. The process of claim 1, wherein said step (c) includes (i) an operation of continuously feeding said electrically conductive porous rod to an impregnation zone for said second electrode active material, wherein said electrically conductive porous rod contains interconnected electron-conducting pathways and has at least one porous surface; and (ii) an operation of impregnating said second mixture into said electrically conductive porous rod from said at least one porous surface to form said second electrode.

22. The process of claim 21, wherein said step (c) includes delivering, continuously or intermittently on demand, said second mixture to said at least one porous surface through spraying, printing, coating, casting, conveyor film delivery, and/or roller surface delivery.

23. The process of claim 1, wherein said step (b) contains wrapping around said first electrode with a porous separator band in a coiled or spiral manner to form said porous separator-protected first electrode.

24. The process of claim 1, wherein said step (b) contains spraying an electrically insulating material to encase said first electrode, forming a porous shell structure covering said first electrode to form said porous separator-protected structure.

* * * * *